(12) United States Patent
Xiong

(10) Patent No.: US 12,150,016 B2
(45) Date of Patent: Nov. 19, 2024

(54) MULTICAST SERVICE ACTIVATION IN WIRELESS COMMUNICATION NETWORKS

(71) Applicant: Tencent Technology (Shenzhen) Company Limited, Guangdong (CN)

(72) Inventor: Chunshan Xiong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 378 days.

(21) Appl. No.: 17/705,163

(22) Filed: Mar. 25, 2022

(65) Prior Publication Data

US 2022/0217508 A1 Jul. 7, 2022

Related U.S. Application Data

(63) Continuation of application No. PCT/CN2021/081521, filed on Mar. 18, 2021.

(30) Foreign Application Priority Data

May 13, 2020 (CN) .......................... 202010405814.9

(51) Int. Cl.
*H04W 4/06* (2009.01)
*H04L 45/16* (2022.01)
*H04L 61/5007* (2022.01)
*H04W 76/10* (2018.01)

(52) U.S. Cl.
CPC ............. *H04W 4/06* (2013.01); *H04L 45/16* (2013.01); *H04L 61/5007* (2022.05); *H04W 76/10* (2018.02)

(58) Field of Classification Search
CPC ....... H04W 4/06; H04W 76/10; H04W 76/11; H04W 76/40; H04W 48/18; H04W 36/0007; H04W 36/0011; H04W 36/0033; H04L 45/16; H04L 61/5007
See application file for complete search history.

(56) References Cited

U.S. PATENT DOCUMENTS

| 2018/0192289 | A1* | 7/2018 | Dao ....................... H04W 12/03 |
| 2018/0376444 | A1 | 12/2018 | Kim et al. | |
| 2019/0223250 | A1* | 7/2019 | Dao ....................... H04W 72/23 |
| 2019/0349976 | A1 | 11/2019 | Rudolf | |

(Continued)

FOREIGN PATENT DOCUMENTS

| CN | 1725690 A | 1/2006 |
| CN | 1998195 A | 7/2007 |
| CN | 101094204 A | 12/2007 |

(Continued)

OTHER PUBLICATIONS

International Search Report and Written Opinion issued Jun. 18, 2021 in Application No. PCT/CN2021/081521 with English Translation.

(Continued)

*Primary Examiner* — Walli Z Butt
(74) *Attorney, Agent, or Firm* — ArentFox Schiff LLP

(57) ABSTRACT

A method includes determining whether a user equipment activating a multicast service is to establish a Protocol Data Unit session and acquire an Internet Protocol (IP) address assigned by a Session Management Function (SMF) entity, and activating the multicast service for the user equipment through the SMF entity based on the determination.

20 Claims, 13 Drawing Sheets

(56) References Cited

U.S. PATENT DOCUMENTS

| | | | |
|---|---|---|---|
| 2021/0075631 A1* | 3/2021 | Liao | H04M 15/8038 |
| 2021/0392466 A1* | 12/2021 | Liu | H04W 76/40 |

FOREIGN PATENT DOCUMENTS

| | | |
|---|---|---|
| CN | 101742415 A | 6/2010 |
| CN | 101925009 A | 12/2010 |
| CN | 110169104 A | 8/2019 |
| CN | 110972078 A | 4/2020 |
| CN | 111526552 A | 8/2020 |

OTHER PUBLICATIONS

Nokia 3GPP TSG-SA5 Meeting #119 S5-183336 Add support for 5G Trace (triggering events in 5GC), May 18, 2018.

Supplementary European Search Report for 21804713.2, issued Oct. 19, 2022, 16 pages.

Samsung: "Solution for unicast-multicast deli very mode switch", 3GPP Draft; S2-2000891, 3rd Generation Partnership Project (3GPP), Mobile Competence Centre ; 650, Route Des Lucioles ; F-06921 Sophia-Antipolis Cedex ; France, vol. SA WG2, No. Incheon, South Korea; 20200113-20200117, Jan. 7, 2020, pp. 1-5.

Huawei et al: "MBS Session Management", 3GPP Draft; S2-2000489, 3rd Generation Partnership Project (3GPP), Mobile Competence Centre ; 650, Route Des Lucioles ; F-06921 Sophia-Antipolis Cedex ; France vol. SA WG2, No. Incheon, South Korea; 20200113-20200117, Jan. 7, 2020, pp. 1-4.

Oppo: "Solution for Broadcast Session Start", 3GPP Draft; S2-2001707, 3rd Generation Partnership Project (3GPP), Mobile Competence Centre ; 650, Route Des Lucioles ; F-06921 Sophia-Antipolis Cedex ; France, vol. SA WG2, No. Incheon, Korea; 20200113-20200117, Jan. 27, 2020, pp. 1-4.

"3rd Generation Partnership Project; Technical Specification Group Services and System Aspects; System architecture for the 5G System (SGS); Stage 2 (Release 16)"3GPP Draft; 23501-40_CRS_IMPLEMENTED_CR2195FIX_CR2085_MOD_R4, 3rd Generation Partnership Project (3GPP), Mobile Competence Centre ; 650, Route Des Lucioles ; F-06921 Sophia-Antipolis Cedex; France, Mar. 27, 2020, pp. 1-430.

"3rd Generation Partnership Project; Technical Specification Group Services and System Aspects; Procedures for the 5G System (SGS); Stage 2 (Release 16)", 3GPP Draft; 23502-G40_CRS_IMPLEMENTED, 3rd Generation Partnership Project (3GPP), Mobile Competence Centre ; 650, Route Des Lucioles ; F-06921 Sophia-Antipolis Cedex ; France, Mar. 25, 2020, pp. 1-582.

Chinese Office Action for 202010406531.6, issued Aug. 28, 2023, 48 pages.

Chinese Office Action for 202010405815.3, issued Aug. 28, 2023, 35 pages.

Chinese Office Action for 202010406531.6, issued Jan. 21, 2024, 37 pages.

Chinese Office Action for 202010405815.3, issued Jan. 22, 2024, 31 pages.

Oppo, Solution for MBS session deactivation and activation, SA WG2 Meeting #S2-139E, S2-20xxxxx Jun. 1-12, 2020, Electronic, Elbonia, SA WG2 Temporary Document, May 12, 2020, pp. 1-5.

Oppo, Solution for Broadcast Session Start, SA WG2 Meeting #136AH S2-2000322 Jan. 13-17, 2020, Incheon, Korea, SA, S2-2000322, WG2 Temporary Document, Jan. 7, 2020, pp. 1-4.

Chinese Office Action for 202010405814.9, issued Jun. 1, 2023, 20 pages.

* cited by examiner

MULTICAST SERVICE ACTIVATION IN WIRELESS COMMUNICATION NETWORKS

RELATED APPLICATIONS

This application is a continuation of International Application No. PCT/CN2021/081521, filed on Mar. 18, 2021, which claims priority to Chinese Patent Application No. 202010405814.9 filed on May 13, 2020, and entitled "METHOD EXECUTED BY UE, METHOD EXECUTED BY SMF, AND SMF ENTITY The entire disclosures of the prior applications are hereby incorporated by reference.

FIELD OF THE TECHNOLOGY

The present disclosure relates to the field of wireless communication, including a method executed by a User Equipment (UE), a method executed by a Session Management Function (SMF) entity, and a corresponding SMF entity.

BACKGROUND OF THE DISCLOSURE

Existing wireless communication systems can support Multimedia Broadcast and Multicast Service (MBMS). Specifically, MBMS can be divided into a multicast service and a broadcast service. "Multicasting" means that the same content is transmitted to a plurality of users. The multicast mode can transmit data to all target entities at a time, and supports the transmission of data to only specific users. "Broadcasting" is also to transmit the same content to a plurality of users, but does not allow for selection of users. Therefore, a data transmission may be performed even if there is no user in the network to receive the data transmission.

In 2nd generation/3rd generation wireless communication systems, some technical solutions for activating multicast services have been proposed. FIG. 1 shows a schematic flowchart of a related method for activating a multicast service. As shown in FIG. 1, in step 1, a UE may select an Access Point Name (APN) to establish a Protocol Data Unit (PDU) context, and the APN assigns the UE an Internet Protocol (IP) address. In FIG. 1, the APN is shown as a Gateway GPRS Support Node (GGSN), and may be identified by APN0. In step 2, first, the UE may select an IP multicast address, where the IP multicast address can identify a specific multicast service. Then, the UE may transmit an Internet Group Management Protocol (IGMP) Join data packet to the network to indicate that the UE requests to join a multicast group corresponding to the IP multicast address. In step 3, a Broadcast Multicast Service Center (BM-SC) authenticates whether the UE can join the multicast group according to subscription data of the UE, and provides an APN (which is identified by APN1) that the UE needs to use to join the multicast group. Then, the APN1 that the UE needs to use is delivered to the UE through steps 4a, 4b, and 5. In step 6, the UE initiates a new MBMS session according to the APN1 provided by the BM-SC, where MBMS capabilities (e.g., Quality of Service (QoS) capabilities) of the APN1 and the UE need to be included. In step 7, a Serving GPRS Support Node (SGSN) checks whether the UE has subscribed to the APN1. If the check fails, the SGSN notifies the GGSN of the failure, or otherwise the SGSN creates a multicast UE context for this IP address. In step 8, the SGSN selects another GGSN (which is a GGSN supporting multicast services) according to the APN1, and transmits an MBMS creation request message to the GGSN, where the message at least includes a UE ID, APN1, and the IP multicast address. In step 9, the BM-SC authorizes the UE according to subscription information of the UE. In step 10, if access of the UE is authorized and there is no context of any UE indicated by the IP Multicast Address on the GGSN, that is, the UE is the first to access the multicast service identified by the IP Multicast Address on the GGSN, the UE registers with the upstream entity BM-SC to indicate that multicast service data to be transmitted to the IP multicast address needs to be transmitted to this GGSN. In step 11, the GGSN creates an MBMS UE context corresponding to the IP multicast address for the UE, and transmits an indication to the SGSN to indicate that the MBMB UE context is successfully created. In step 12, similar to step 10, if there is no context of any UE indicated by the IP multicast address on the SGSN, that is, the UE is the first to access the multicast service identified by the IP multicast address on the SGSN, the UE registers with the upstream entity GGSN to indicate that multicast service data to be transmitted to the IP multicast address needs to be transmitted to this SGSN.

It can be seen that in the process shown in FIG. 1, only after the UE selects an APN (e.g., APN0 described above), can the UE acquire the APN (e.g., APN1 described above) that the UE needs to use to join the multicast group, to activate a multicast context and really join the multicast group. Therefore, the process shown in FIG. 1 is complex, requiring a large number of information exchanges between the entities. In addition, in the process shown in FIG. 1, the UE needs to transmit the IGMP Join data packet to the GGSN. IGMP is based on the IP network protocol rather than a mobile network protocol, and some terminals supporting only mobile applications are developed with the development of wireless communication technologies (e.g., with the advent of 5th-generation wireless communication systems). Therefore, if the process shown in FIG. 1 continues to be used, such terminals supporting only mobile applications cannot send out an IGMP Join data packet. In addition, some terminals only need to receive data, and does not need to send data. For example, a screen placed in a public place (such as a cafeteria or a departure lobby) is only used for receiving and displaying data, and does not need to send data. That is to say, such terminals do not need to be assigned an IP address.

In addition, some IP terminals that can access a wireless communication network in certain ways (e.g., through a wireless modem) can receive a multicast service through such wireless methods. However, with the development of wireless communication technologies, the network architecture corresponding to the flow shown in FIG. 1 has changed, and the network entities in the network architecture have also changed. Therefore, how such IP terminals perform the multicast service in the new wireless communication systems is a technical problem to be solved.

In addition, in systems prior to the 5th-generation wireless communication systems, the QoS of IP data flows is controlled by a BM-SC. In 5th-generation wireless communication systems, a Policy Control and Charging (PCC) architecture and technology is proposed. The PCC architecture and technology is a key technology in the 5th-generation wireless communication systems and can provide policy control related to UE Route Selection Policy (URSP), access and mobility, session management and the like for the UE, Access and Mobility management Function (AMF) entity, SMF entity, etc., so as to realize the refined QoS and charging control of IP data flows by operators. Therefore, how to combine the PCC with the transmission of multicast/ broadcast service data in a fifth-generation wireless communication system is also a technical problem to be solved.

SUMMARY

In order to overcome the defects in the related art, the present disclosure provides a method executed by a user equipment, a corresponding user equipment, a method executed by a session management function entity, and a corresponding session management function entity.

In an embodiment, a method includes determining, by processing circuitry of user equipment (UE), an activation manner for activating a multicast service, the activation manner defining whether the UE is to establish a Protocol Data Unit (PDU) session and acquire an Internet Protocol (IP) address assigned by a Session Management Function (SMF) entity; and activating the multicast service according to the determined activation manner through the SMF entity.

In an embodiment, a method includes receiving, by processing circuitry of a session management function (SMF) entity, from a user equipment (UE), a request for activating a user equipment multicast service context, the user equipment multicast service context being established by the UE for activating a multicast service, the request for activating the user equipment multicast service context including a third identifier and a multicast address of the multicast service, and the third identifier identifying the user equipment multicast service context. The method further includes generating a response to the request for activating the user equipment multicast service context, the response comprising a fourth identifier corresponding to the multicast service, the fourth identifier indicating to the UE whether the multicast service is activated, and transmitting the response to the UE.

In an embodiment, a user equipment (UE) apparatus includes processing circuitry configured to determine an activation manner for activating a multicast service, the activation manner defining whether the UE is to establish a Protocol Data Unit (PDU) session and acquire an Internet Protocol (IP) address assigned by a Session Management Function (SMF) entity, and activate the multicast service according to the determined activation manner through the SMF entity.

According to the method executed by a user equipment and the corresponding user equipment according to the above aspects of the present disclosure, the user equipment may determine an activation manner for activating a multicast service, and activate the multicast service according to the determined activation manner through a session management function entity in a network, thereby either optimizing the multicast service activation process or achieving a compatibility with the multicast service activation process.

In addition, according to the method executed by a session management function entity and the corresponding session management function entity according to the above aspects of the present disclosure, in the multicast service activation process, the session management function entity may receive, from a user equipment, a first identifier and a second identifier corresponding to a multicast service to be activated by the user equipment, a third identifier, and a multicast address of the multicast service, determine a fourth identifier corresponding to the multicast service at least according to such information, and feed back the fourth identifier to the user equipment, so that the user equipment activates the multicast service.

In addition, according to the method executed by a session management function entity and the corresponding session management function entity according to the above aspects of the present disclosure, the session management function entity may receive a request for requesting to start a multicast/broadcast service session from a policy control function entity, where the request may include a fourth identifier corresponding to a multicast/broadcast service, a quality of service rule of at least one data flow corresponding to the multicast/broadcast service, and an identifier of the multicast/broadcast service session; and the session management function entity may perform the multicast/broadcast service session according to the request to transmit multicast/broadcast service data, thereby realizing the application of the PCC technology to the transmission of multicast/broadcast service data, and achieving the integration of PCC with the transmission of multicast/broadcast service data.

BRIEF DESCRIPTION OF THE DRAWINGS

The foregoing and other objectives, features, and advantages of the present disclosure are more obvious through a more detailed description of embodiments of the present disclosure with reference to the accompanying drawings. The accompanying drawings are intended to provide further understanding of the present disclosure and constitute a part of this specification. The accompanying drawings and the embodiments of the present disclosure are used together for explaining the present disclosure rather than constituting a limitation to the present disclosure. In the accompanying drawings, the same reference numerals generally represent the same components or steps.

DESCRIPTION OF EMBODIMENTS

Figure 1:
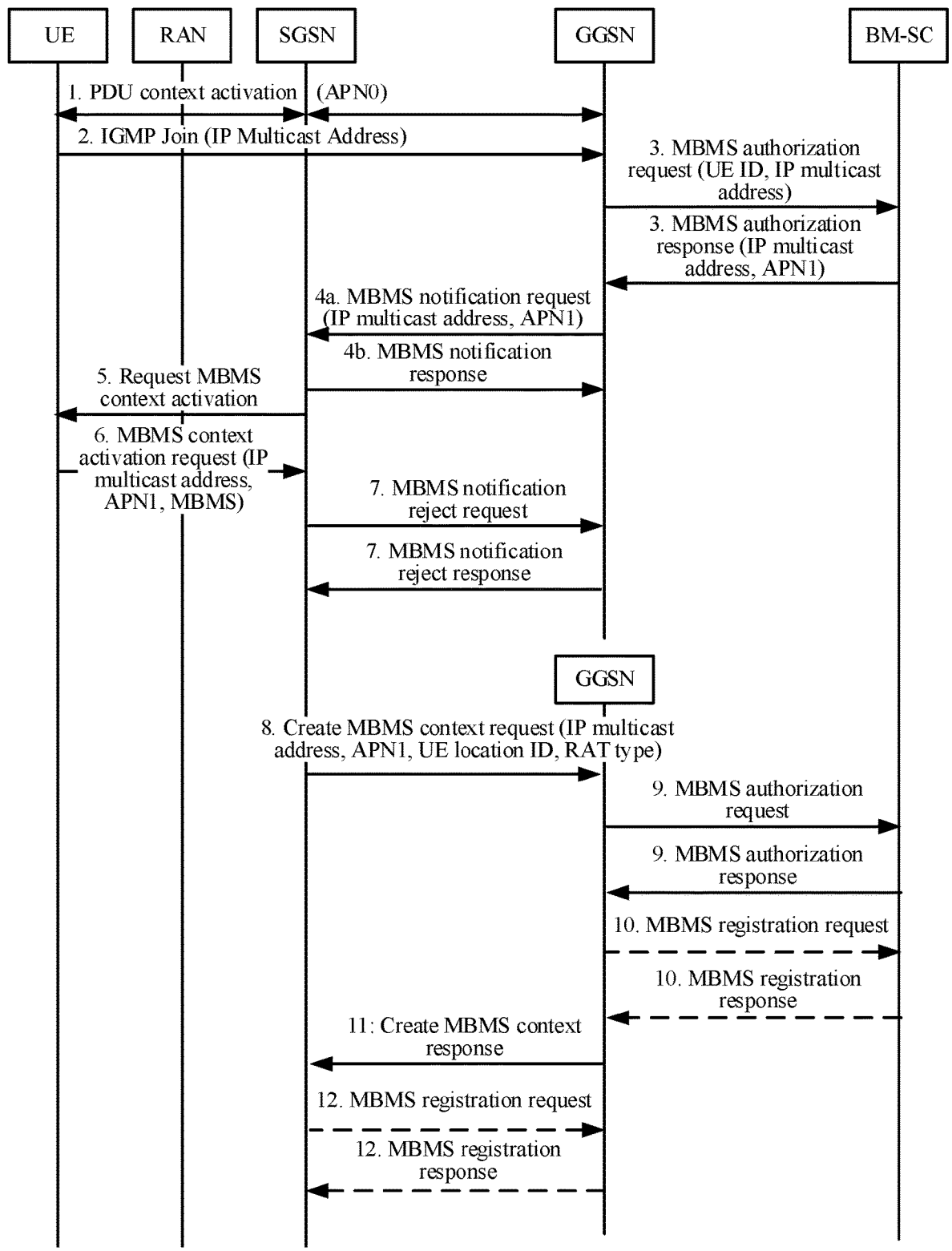
FIG. 1 is a schematic flowchart of a related method for activating a multicast service.

To describe the objectives, technical solutions, and advantages of the present disclosure, exemplary embodiments of the present disclosure are described in detail below with reference to the accompanying drawings. In the accompanying drawings, same reference numerals represent same elements throughout. It is to be understood that the described embodiments are merely illustrative and are not to be construed as limiting the scope of the present disclosure. In addition, a user equipment (UE) described herein may include various types of terminals, such as mobile terminals or IP terminals. For convenience, these terms are sometimes used interchangeably.

Figure 2:
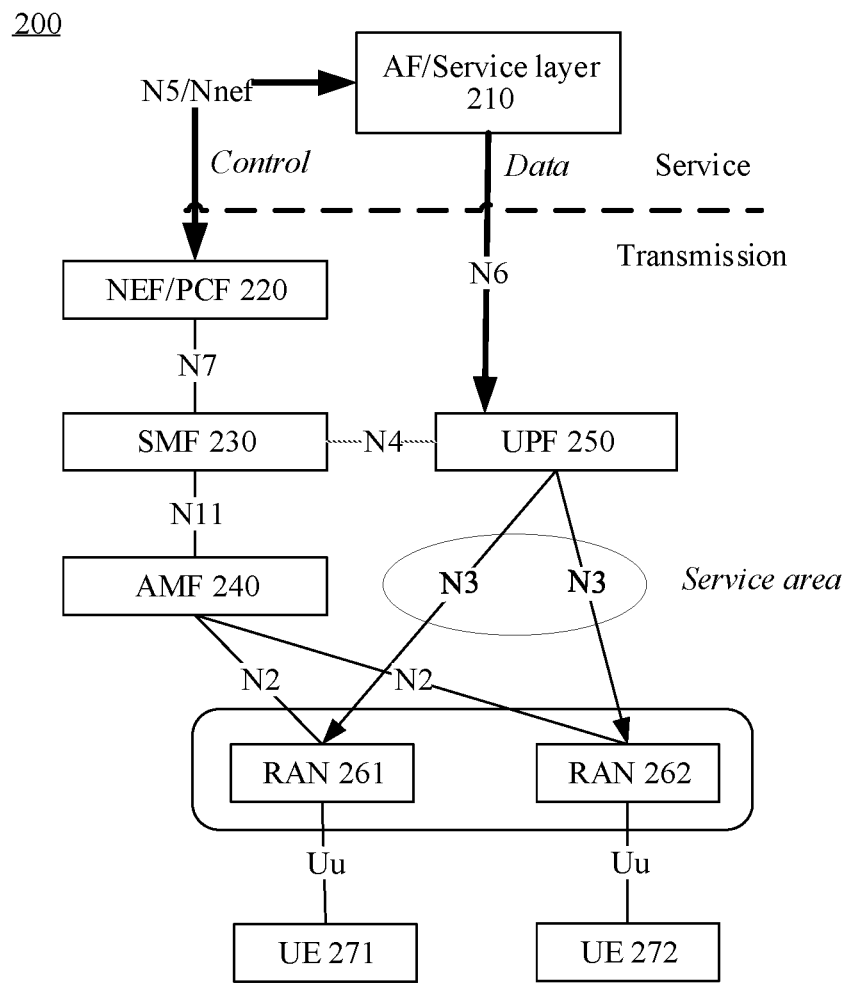
FIG. 2 is a schematic diagram of an architecture of a wireless communication system applying the embodiments of the present disclosure.

First, a wireless communication system where the embodiments of the present disclosure may be applied will be described with reference to FIG. 2. FIG. 2 is a schematic diagram of an architecture of a wireless communication system applying the embodiments of the present disclosure. The wireless communication system may be a 5th-generation (5G) wireless communication system, or may be any other type of wireless communication system, such as a 6G wireless communication system. Hereinafter, the embodiments of the present disclosure are described by taking a 5G wireless communication system as an example. However, it is to be appreciated that the following description is also applicable to other types of wireless communication systems.

Specifically, the wireless communication system 200 includes an Application Function (AF) entity 210, a Network Exposure Function (NEF)/Policy Control Function (PCF) entity 220, a Session Management Function (SMF)) entity 230, an Access and Mobility management Function (AMF) entity 240, a User Plane Function (UPF) entity 250, and Radio Access Networks (RANs) 261-262, and UEs 271-272 served thereby, where the NEF/PCF entity 220, the SMF entity 230, and the AMF entity 240 are entities of a control plane, while the UPF entity 250 is an entity of a user plane. In addition, the AF described herein may also be referred to as a service layer. The entities described herein may be one or more servers. In the present disclosure, an "entity" may also be referred to as a node. For convenience, the terms "entity" and "node" are sometimes used interchangeably.

In addition, the AF entity 210 may provide service data, and support application influence on service paths, interaction with a measurement framework for policy control, etc. The NEF entity in the NEF/PCF entity 220 may support QoS capability exposure, event subscription capability exposure, AF-requested traffic routing, AF-requested parameter provisioning, etc. The PCF entity in the NEF/PCF entity 220 may support a unified policy framework to manage network behavior and provide policy rules to control the control plane, etc. The SMF entity 230 may support session management, etc., where the session management may include session establishment, modification, release, etc. The AMF entity 240 may support access authentication, mobility management, registration management, connection management, lawful interception of the UE, and support transmission of session management information between the UE and the SMF entity, etc. The UPF entity 250 may have a function of routing data packets, for example, may acquire data packets from the AF entity 210 and transmit data packets to the RANs 261-262, etc. The RAN 261 and/or 262 may be an access network consisting of base stations. The base station herein may be any type of base station, for example, a 5G base station, or a base station or a Wi-Fi AP in a communication system.

In addition, the UE 271 and/or 272 may be connected to the RAN 261 and/or 262 through a Uu interface. The RAN 261 and/or 262 may be connected to the AMF entity 240 through an N2 interface and connected to the UPF entity 250 through an N3 interface. The UPF entity 250 may be connected to the SMF entity 230 through an N4 interface and connected to the AF entity 210 through an N6 interface. The AMF entity 240 is connected to the SMF entity 230 through an N11 interface. The SMF entity 230 is connected to the NEF/PCF entity 220 through an N7 interface. The NEF/PCF entity 220 is connected to the AF entity 210 through an N5 or Nnef interface.

In addition, FIG. 2 also shows a service area between the UPF entity 250 and the RANs 261-262, as indicated by ellipses in FIG. 2. In the present disclosure, multiple routing switching devices (e.g., routers) may be deployed within the service area, where each routing switching device may be connected to the UPF entity 250 and connected to one or more RANs, so that the UPF entity 250 transmits service data to each routing device and each routing device transmits the service data to the corresponding RAN.

In addition, in the present disclosure, the AF entity may support a Multicast Broadcast Service (MBS). Therefore, the AF entity may also be referred to as an MBS AF entity. For convenience, these terms are sometimes used interchangeably.

It is to be understood that in the present disclosure, the term "multicast/broadcast service" means a multicast service or a broadcast service. In addition, the term "multicast/broadcast address" used below means a multicast address or a broadcast address, and the term "multicast/broadcast address of a (or the) multicast/broadcast service" used below means a multicast address of a multicast service or a broadcast address of a broadcast service.

Although it is shown in FIG. 2 that the number of entities of each type is one, this is only exemplary, and the wireless communication system may include a larger number of entities. In addition, although two RANs and two UEs are shown in FIG. 2, this is merely exemplary, the wireless communication system may include fewer or more RANs and/or fewer or more UEs, and correspondingly, the wireless communication system may include fewer or more cells.

In the present disclosure, when a UE intends to activate a multicast service, the UE may determine an activation manner for activating the multicast service, and activate the multicast service according to the determined activation manner. In the process of activating a multicast service by a UE, information exchanges between multiple entities in the wireless communication system (e.g., the AF entity 210, the NEF/PCF entity 220, the SMF entity 230, the AMF entity 240, the UPF entity 250, etc. in FIG. 2) will be involved.

Figure 3:
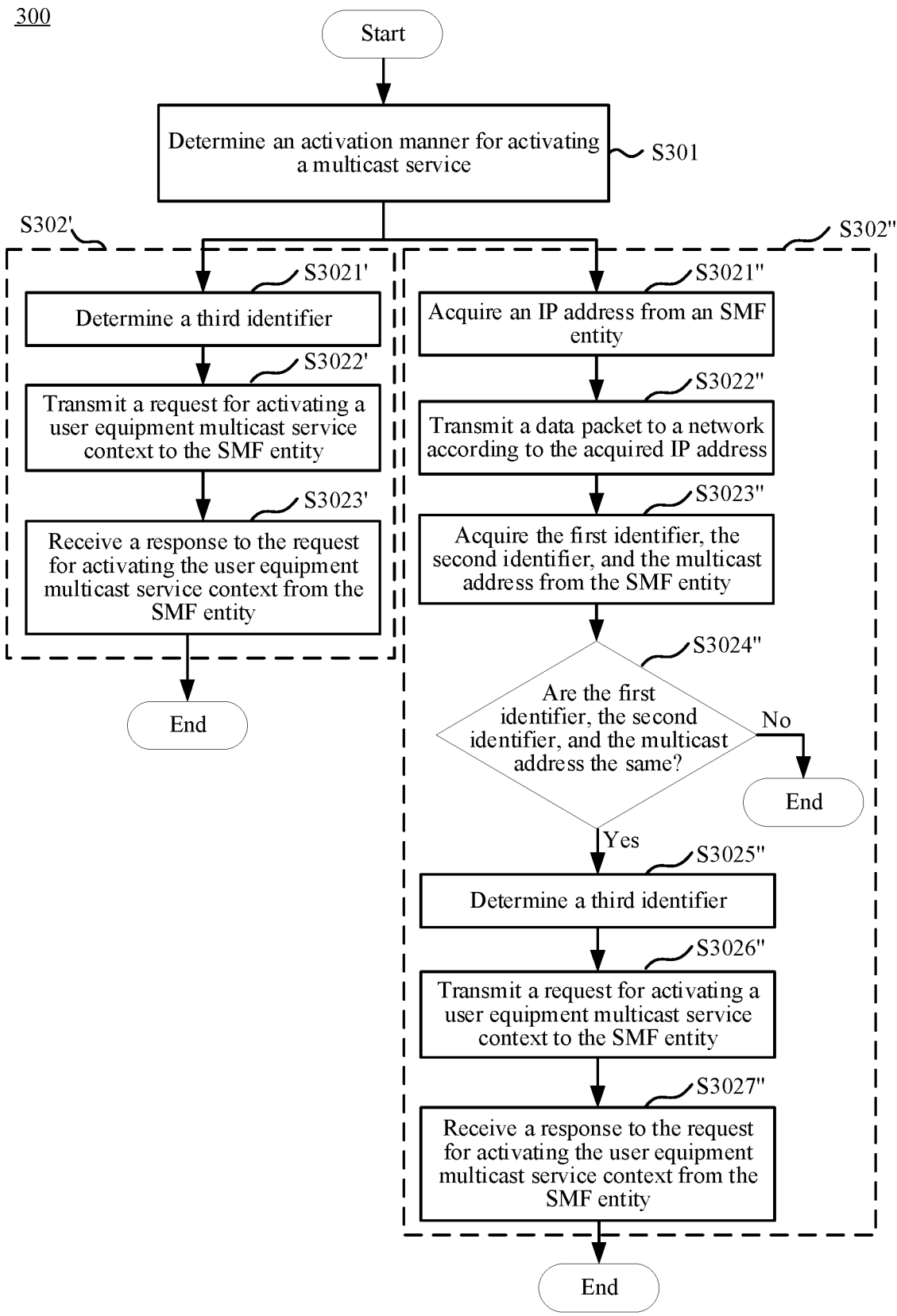
FIG. 3 is a flowchart of a method executed by a user equipment for activating a multicast service according to an embodiment of the present disclosure.

A method executed by a UE for activating a multicast service will be described below with reference to FIG. 3. FIG. 3 is a flowchart of a method 300 executed by a user equipment according to an embodiment of the present disclosure. As shown in FIG. 3, in step S301, the UE determines an activation manner for activating a multicast service. In step S301, the determined activation manner may be a first activation manner or a second activation manner.

According to an example of the present disclosure, in the first activation manner, the UE does not need to establish a Protocol Data Unit (PDU) session and acquire an IP address (e.g., an IP address assigned by an SMF entity) before activating the multicast service. That is to say, in the first activation manner, the UE does not need to perform a step similar to step 1 shown in FIG. 1. Therefore, the first activation manner optimizes the multicast service activation process.

In addition, according to an example of the present disclosure, in the second activation manner, the UE needs to establish a PDU session and acquire an IP address (e.g., an IP address assigned by an SMF entity) before activating the multicast service. That is to say, in the second activation manner, the UE needs to perform a step similar to step 1 shown in FIG. 1. Therefore, the second activation manner is compatible with the multicast service activation process.

In the present disclosure, in step S301, the UE may determine the activation manner for activating the multicast service according to an attribute of the UE. The attribute described herein may refer to a supporting capability of the UE for various applications. For example, when the UE only supports mobile applications or the UE does not need an IP data transmission function, the UE may determine that the activation manner for activating the multicast service is the first activation manner. For example, when the UE needs to support an IP-based application, the UE may determine that the activation manner for activating the multicast service is the second activation manner.

In step S301, the UE may also determine the activation manner for activating the multicast service in other manners, which is not limited in the present disclosure.

In addition, according to an example of the present disclosure, before step S301, the method 300 may further include: the UE determining a first identifier and a second identifier corresponding to the multicast service, where the first identifier and the second identifier are used for an access and mobility management function entity to select the session management function entity. Specifically, the first identifier may be used for identifying a network slice corresponding to the multicast service. For example, the first identifier may be Single Network Slice Selection Assistance Information (S-NSSAI). In addition, the second identifier may be used for identifying a data network corresponding to the multicast service. For example, the second identifier may be a Data Network Name (DNN).

Figure 4:
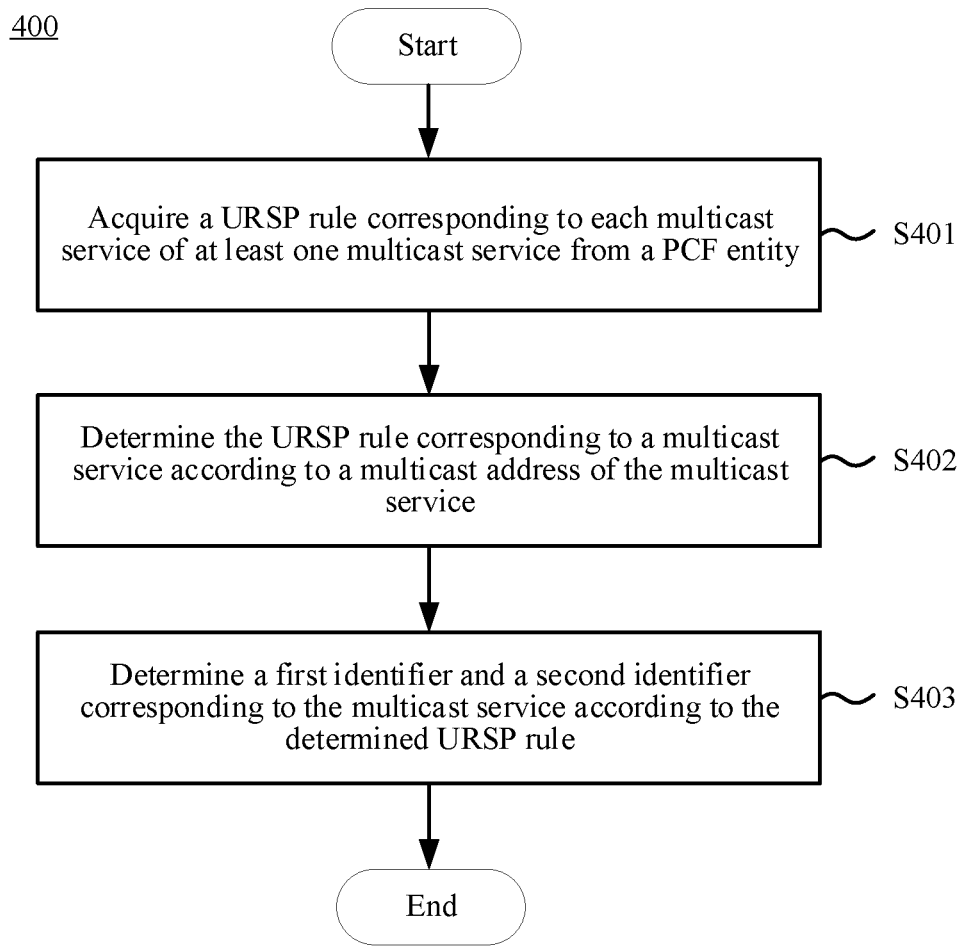
FIG. 4 is a flowchart of a method executed by a user equipment for determining a first identifier and a second identifier corresponding to a multicast service according to an embodiment of the present disclosure.

In this example, the UE may determine the first identifier and the second identifier corresponding to the multicast service by a method 400 shown in FIG. 4. FIG. 4 is a flowchart of a method 400 executed by the user equipment for determining the first identifier and the second identifier corresponding to the multicast service according to an embodiment of the present disclosure.

As shown in FIG. 4, in step S401, the UE may acquire a user equipment route selection policy rule (UE Route Selection Policy Rule, URSP) corresponding to each multicast service of one or more multicast services from a policy control function (PCF) entity, where each user equipment route selection policy rule includes at least a multicast address of the corresponding multicast service. For example, first, the UE may initiate a registration procedure with the network; then, in a process of establishing a UE policy association between an AMF entity and the PCF entity, the PCF entity may provide the UE with a URSP rule corresponding to each multicast service in at least one multicast service through the AMF entity, and correspondingly, the UE may acquire the URSP rule corresponding to each multicast service in the at least one multicast service from the PCF entity through the AMF entity.

Then, in step S402, the UE may determine a user equipment route selection policy rule corresponding to the multicast service according to a multicast address of the multicast service. For example, when the UE intends to activate a multicast service, the UE may determine a URSP rule corresponding to the multicast service according to a multicast address of the multicast service.

Then, in step S403, the UE may determine the first identifier and the second identifier corresponding to the multicast service according to the determined user equipment route selection policy rule. For example, the UE may obtain a route selection descriptor according to the URSP rule corresponding to the multicast service, where the route selection descriptor includes a first identifier and a second identifier; then, the UE uses the first identifier and the second identifier included in the route selection descriptor as the first identifier and the second identifier corresponding to the multicast service.

In the present disclosure, the multicast address of the multicast service may be an IPv4 multicast address or an IPv6 multicast address, which is not limited in the present disclosure.

Returning to FIG. 3, after step S301, in step S302, the UE activates the multicast service according to the determined activation manner through a session management function entity.

According to an example of the present disclosure, when the activation manner determined by the UE in step S301 is the first activation manner, the UE executes step S302'. In step S302', the UE activates the multicast service according to the first activation manner through the session management function entity. In this example, step S302' may include three sub-steps, namely step S3021', step S3022' and step S3023'.

Specifically, in step S3021', the UE may determine a third identifier, where the third identifier is used for identifying a user equipment multicast service context established for activating the multicast service. For example, the UE may assign an identifier (ID) to the user equipment multicast service context. The "user equipment multicast service context established for activating the multicast service" described herein may also be referred to as a user equipment multicast service context for the multicast service (MBS UE Context). Correspondingly, the third identifier may also be referred to as an identifier of the user equipment multicast service context for the multicast service (MBS UE Context ID).

The UE may use multicast addresses of different multicast services, thereby activating multiple different multicast services. Correspondingly, the UE may assign different third identifiers for different multicast services, so as to respectively identify the user equipment multicast service contexts established for activating these different multicast services.

Then, in step S3022', the UE transmits a request for activating the user equipment multicast service context to the session management function entity, where the request for activating the user equipment multicast service context includes the first identifier and a multicast address of the multicast service. For example, the UE may transmit the request for activating the user equipment multicast service context to the session management function entity through the access and mobility management function entity.

Specifically, first, the UE may transmit an uplink Non-Access Stratum (NAS) transport (UL NAS Transport) message to the AMF entity, where the UL NAS Transport message includes at least three information elements, among which a first information element is the first identifier corresponding to the multicast service, a second information element is the second identifier corresponding to the multicast service, and a third information element is a request for activating the MBS UE Context. The request for activating the MBS UE Context may be represented as Active MBS UE Context Request, and may include the third identifier corresponding to the multicast service and the multicast address of the multicast service. In an example where the first identity is S-NSSAI, the second identity is DNN, and the third identifier is MBS UE Context ID, the UL NAS Transport message transmitted by the UE to the AMF entity may include three information elements, among which a first information element is the S-NSSAI corresponding to the multicast service, a second information element is the DNN corresponding to the multicast service, and a third information element is a request for activating the MBS UE Context. The request for activating the MBS UE Context includes the MBS UE Context ID corresponding to the multicast service and the multicast address of the multicast service.

In the present disclosure, the UE may encapsulate the "request for activating the MBS UE Context" described herein using a specific format. For example, the specific format may be an N1 interface-related session management container for the multicast service (N1 MBS SM Container).

Then, the AMF entity may select the corresponding SMF entity according to the first identifier and the second identifier corresponding to the multicast service. In an example where the first identifier is S-NSSAI and the second identifier is DNN, the AMF entity may select the corresponding SMF entity according to the S-NSSAI and the DNN corresponding to the multicast service.

Then, the AMF entity may transmit a request to the corresponding SMF entity through an Nsmf interface, where the request requests to create an MBS UE Context related to an MBS session. This request may be represented as Nsmf_MBSSession_CreateMBSUEContext Request. The request may include the first identifier and the second identifier corresponding to the multicast service, and the "request for activating the MBS UE Context" described above. In an example where the first identifier is S-NSSAI, the second identifier is DNN, and the third identifier is MBS UE Context ID, the AMF entity may transmit a request to the SMF entity through the Nsmf interface, where the request may include the S-NSSAI corresponding to the multicast service, the DNN corresponding to the multicast service, and the "request for activating the MBS UE Context" described above.

In addition, according to an example of the present disclosure, the request transmitted by the AMF entity to the SMF entity may further include a dedicated identifier of the UE. For example, the dedicated identifier of the UE may be a Subscription Permanent Identifier (SUPI). In addition, according to another example of the present disclosure, the request transmitted by the AMF entity to the SMF entity may further include an identifier of a serving base station of the UE. For example, the identifier of the serving base station of the UE may be a corresponding RAN ID, and the RAN ID may be reported to the AMF entity by a RAN accessed by the UE. In addition, according to another example of the present disclosure, the request transmitted by the AMF entity to the SMF entity may further include both the dedicated identifier of the UE and the identifier of the serving base station of the UE, e.g., the SUFI of the UE and the corresponding RAN ID.

After step S3022', the SMF entity may record the received RAN ID in the MBS UE Context of the UE, so that subsequently the SMF entity acquires identifiers of base stations serving all user equipments that activate the multicast service through the SMF entity. In addition, the SMF entity determines a fourth identifier corresponding to the multicast service according to the received information, where the fourth identifier is used for the user equipment to determine whether the multicast service is activated, and the fourth identifier is an identifier assigned by an application function (AF) entity to the multicast service; and the SMF entity feeds back the fourth identifier to the UE. These operations will be described in detail below with reference to a method executed by an SMF entity described in conjunction with FIGS. 5-6.

The fourth identifier described herein may be a Temper Mobile Group Identity (TMGI) assigned by the AF entity to the multicast service activated based on the multicast address.

Then, in step S3023', the UE receives a response to the request for activating the user equipment multicast service context from the session management function entity, where the response includes a fourth identifier corresponding to the multicast service, and the fourth identifier is used for the user equipment to determine whether the multicast service is activated. Specifically, the UE may receive a response to the request for activating the user equipment multicast service context from the session management function entity through a serving base station of the user equipment and the access and mobility management function entity.

Specifically, first, the SMF entity may transmit a response message to the AMF entity through an Nsmf interface, in response to the Nsmf_MBSSession_CreateMBSUEContext Request transmitted by the AMF entity to the SMF entity described above with reference to step S3022'. The response message may be an acknowledgement of the Nsmf MBSSession CreateMBSUEContext Request transmitted by the AMF entity to the SMF entity described above with reference to step S3022'. The response message may be represented as Nsmf_MBSSession_CreateMBSUEContext Response.

Then, the SMF entity may transmit another request message to the AMF entity through an Namf interface, in response to the request for activating the MBS UE Context transmitted by the AMF entity to the SMF entity described above with reference to step S3022'. The another request message may include the "response to the request for activating the user equipment multicast service context" described above, and the "response to the request for activating the user equipment multicast service context" described above may include the fourth identifier corresponding to the multicast service. For example, the another request message may be transmitted through a message related to the N1 interface and communicated through the Namf interface, may be represented as Namf_Communication_N1MessageTransfer, and may include the response to the request for activating the user equipment multicast service context, e.g., an Activate MBS UE Context Response. The Activate MBS UE Context Response includes the fourth identifier corresponding to the multicast service. In an example where the fourth identifier is a TMGI, the Activate MBS UE Context Response includes a TMGI corresponding to the multicast service.

In the present disclosure, the SMF entity may encapsulate the "Activate MBS UE Context Response" described herein using a specific format. For example, the specific format may be an N1 interface-related session management container for the multicast service (N1 MBS SM Container).

Then, the AMF entity may transmit a downlink NAS transport message related to an N2 interface to the RAN through the N2 interface. The downlink NAS transport message related to the N2 interface may be represented as N2 downlink NAS Transport. The downlink NAS transport message related to the N2 interface may include a downlink NAS transport (DL NAS Transport) message, where the DL NAS Transport message includes an information element, that is, the "Activate MBS UE Context Response" described above. Through the downlink NAS transport message related to the N2 interface, the AMF entity may instruct the RAN to directly transmit the DL NAS Transport message to the UE. It is to be understood that the "Activate MBS UE Context Response" included in the DL NAS Transport message described herein may also be encapsulated by the N1 MBS SM Container described above.

Then, the RAN may transmit the DL NAS Transport message described above to the UE. Correspondingly, the UE may acquire the fourth identifier corresponding to the multicast service through the DL NAS Transport message. In an example where the fourth identifier is a TMGI, the UE may acquire the TMGI corresponding to the multicast service through the DL NAS Transport message.

In the present disclosure, when the UE successfully acquires the fourth identifier corresponding to the multicast service, this indicates that the UE has activated the multicast service.

So far, an exemplary process where the UE activates the multicast service according to the first activation manner through the session management function entity has been described. Next, an exemplary process where the UE activates the multicast service according to the second activation manner through the session management function entity will be described.

According to an example of the present disclosure, when the activation manner determined by the UE in step S301 is the second activation manner, the UE executes step S302". In step S302", the UE activates the multicast service according to the second activation manner through the session management function entity. In this example, step S302" may include 7 sub-steps, namely step S3021", step S3022", step S3023", step S3024", step S3025", step S3026" and step S3027".

Specifically, in step S3021", the UE may acquire an Internet Protocol address (IP address) from the session management function entity according to the first identifier and the second identifier corresponding to the multicast service. For example, the UE may select the session management function entity according to the first identifier and the second identifier, establish a protocol data unit session, and acquire an Internet Protocol address from the session management function entity. In an example where the first identifier is S-NSSAI and the second identifier is DNN, the UE may transmit a PDU session establishment request to the network according to the S-NSSAI and the DNN corresponding to the multicast service, where the PDU session establishment request may include the S-NSSAI and the DNN corresponding to the multicast service. Then, the AMF entity may select one SMF entity from multiple SMF entities according to the S-NSSAI and the DNN corresponding to the multicast service. Then, the selected SMF entity may select one UPF entity from multiple UPF entities and assign an IP address to the UE.

Then, in step S3022", the UE may transmit a data packet to the network according to the acquired Internet Protocol address, so that a user plane function (UPF) entity in the network acquires the data packet. For example, the UE may transmit the data packet to the network according to the acquired Internet Protocol (IP) address, so that the user plane function entity participating in the establishment of the protocol data unit session in the network acquires the data packet. In addition, the data packet is used for indicating the multicast service that the user equipment intends to activate. A destination address of the data packet is the multicast address of the multicast service, or a protocol part of the data packet includes the multicast address of the multicast service. For example, after step S3021", the UE may transmit an IGMP Join data packet to the network based on the assigned IP address after completing the establishment of the PDU session. When IGMP version 1 or 2 is used, a destination IP address of the IGMP Join data packet may be the multicast address of the multicast service. When IGMP version 3 is used, an IGMP protocol part of the IGMP Join data packet may include the multicast address of the multicast service.

Then, in step S3023", the UE may acquire a first identifier, a second identifier, and a multicast address from the session management function entity.

Specifically, after step S3022", the SMF entity may acquire a multicast address of a multicast service to be activated by the user equipment from the user plane function entity. For example, the above UPF entity may be configured according to a packet detection rule (PDR) of the SMF entity, and after detecting an IGMP Join data packet, report a multicast address corresponding to the IGMP Join data packet to the SMF entity (e.g., report the multicast address corresponding to the IGMP Join packet through an N4 session report message).

Then, the SMF entity may decide to instruct the user equipment to activate the multicast service. The SMF entity may transmit a request for instructing the user equipment to activate the multicast service to the user equipment in a case that the SMF entity decides to instruct the user equipment to activate the multicast service, where the request for instructing the user equipment to activate the multicast service includes a first identifier and a second identifier corresponding to the multicast service to be activated by the user equipment, and the multicast address of the multicast service. For example, the SMF entity may transmit the request for instructing the user equipment to activate the multicast service to the user equipment through the access and mobility management function entity.

For example, the SMF entity may transmit a message to the AMF entity through an Namf interface, where the message may be transmitted through a message related to the N1 interface and communicated through the Namf interface, and may be represented as Namf_Communication_N1MessageTransfer. The message may include the request for instructing the user equipment to activate the multicast service. For example, the request for instructing the user equipment to activate the multicast service may be a message for requesting MBS UE Context activation, so as to instruct the UE to activate the multicast service. The message may include the S-NSSAI and the DNN corresponding to the multicast service to be activated by the user equipment, and the multicast address of the multicast service, and the message may be represented as Request MBS UE Context Activation. In addition, the "Request MBS UE Context Activation" described herein may be encapsulated using the specific format described above (e.g., N1 MBS SM Container).

Then, the AMF entity may transmit a downlink NAS transport message related to an N2 interface to the RAN through the N2 interface. The downlink NAS transport message related to the N2 interface may be represented as N2 downlink NAS Transport. The downlink NAS transport message related to the N2 interface may include a downlink NAS transport (DL NAS Transport) message, where the DL NAS Transport message may include the above "Request MBS UE Context Activation" encapsulated by the N1 MBS SM Container. Through the downlink NAS transport message related to the N2 interface, the AMF entity may instruct the RAN to directly transmit the DL NAS Transport message to the UE.

Then, the RAN may transmit the DL NAS Transport message described above to the UE. Correspondingly, the UE may acquire a first identity, a second identity, and a multicast address from the SMF entity through the DL NAS Transport message.

After step S3023", in step S3024", the UE may determine whether the acquired first identifier is the same as the determined first identifier, whether the acquired second identifier is the same as the determined second identifier, and whether the acquired multicast address is the same as the multicast address of the multicast service. For example, according to the DL NAS Transport message received from the RAN, the UE may determine whether the multicast address in the "Request MBS UE Context Activation" encapsulated by the N1 MBS SM Container is the same as the multicast service of the multicast service that the UE intends to activate, and determine whether the S-NSSAI and the DNN in the "Request MBS UE Context Activation" encapsulated by the N1 MBS SM Container are the same as the S-NSSAI and the DNN used during the establishment of the PDU session.

When the UE determines in step S3024" that the acquired first identifier is different from the determined first identifier and/or the acquired second identifier is different from the determined second identifier and/or the acquired multicast address is different from the multicast address of the multicast service, the UE cannot activate the multicast service. On the contrary, when the UE determines in step S3024" that the acquired first identifier is the same as the determined first identifier, the acquired second identifier is the same as the determined second identifier, and the acquired multicast address is the same as the multicast addresses of the multicast service, the UE can activate the multicast service.

The UE may execute step S3025", step S3026" and step S3027" to activate the multicast service. Specifically, in step S3025", the UE may determine a third identifier, where the third identifier is used for identifying a user equipment multicast service context established for activating the multicast service. Then, in step S3026", the UE may transmit a request for activating the user equipment multicast service context to the session management function entity, where the request for activating the user equipment multicast service context includes the first identifier and a multicast address of the multicast service. Then, in step S3027", the UE may receive a response to the request for activating the user equipment multicast service context from the session management function entity, where the response includes a fourth identifier corresponding to the multicast service, and the fourth identifier is used for the user equipment to determine whether the multicast service is activated.

The above step S3025", step S3026" and step S3027" are respectively similar to the above step S3021', step S3022' and step S3023', and will not be repeated here.

According to the method executed by a user equipment according to the embodiments of the present disclosure, the user equipment may determine an activation manner for activating a multicast service, and activate the multicast service according to the determined activation manner through a session management function entity in a network, thereby either optimizing the multicast service activation process or achieving a compatibility with the multicast service activation process.

Figure 5:
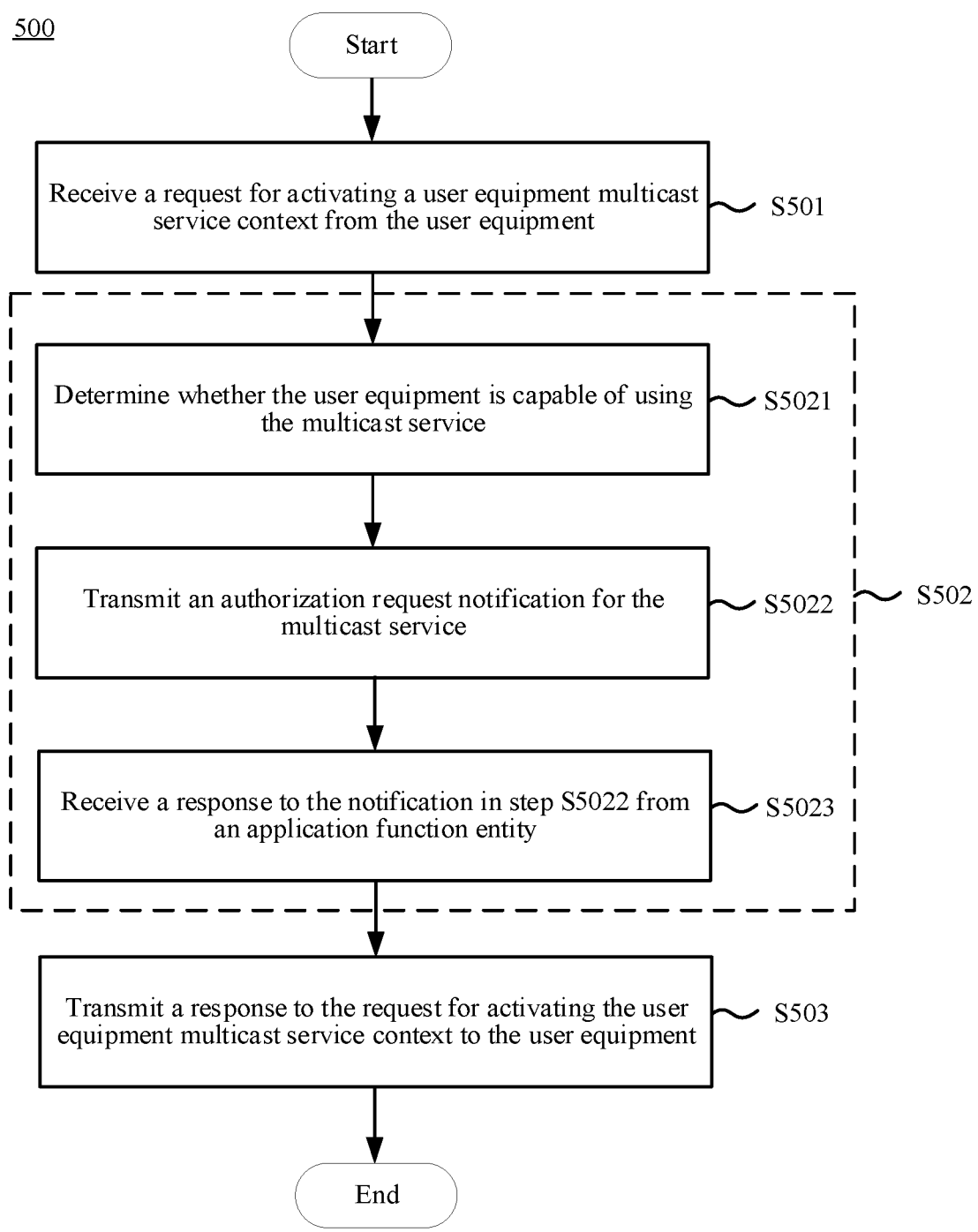
FIG. 5 is a flowchart of a method executed by a session management function entity when a user equipment activates a multicast service according to a first activation manner according to an embodiment of the present disclosure.
Figure 6:
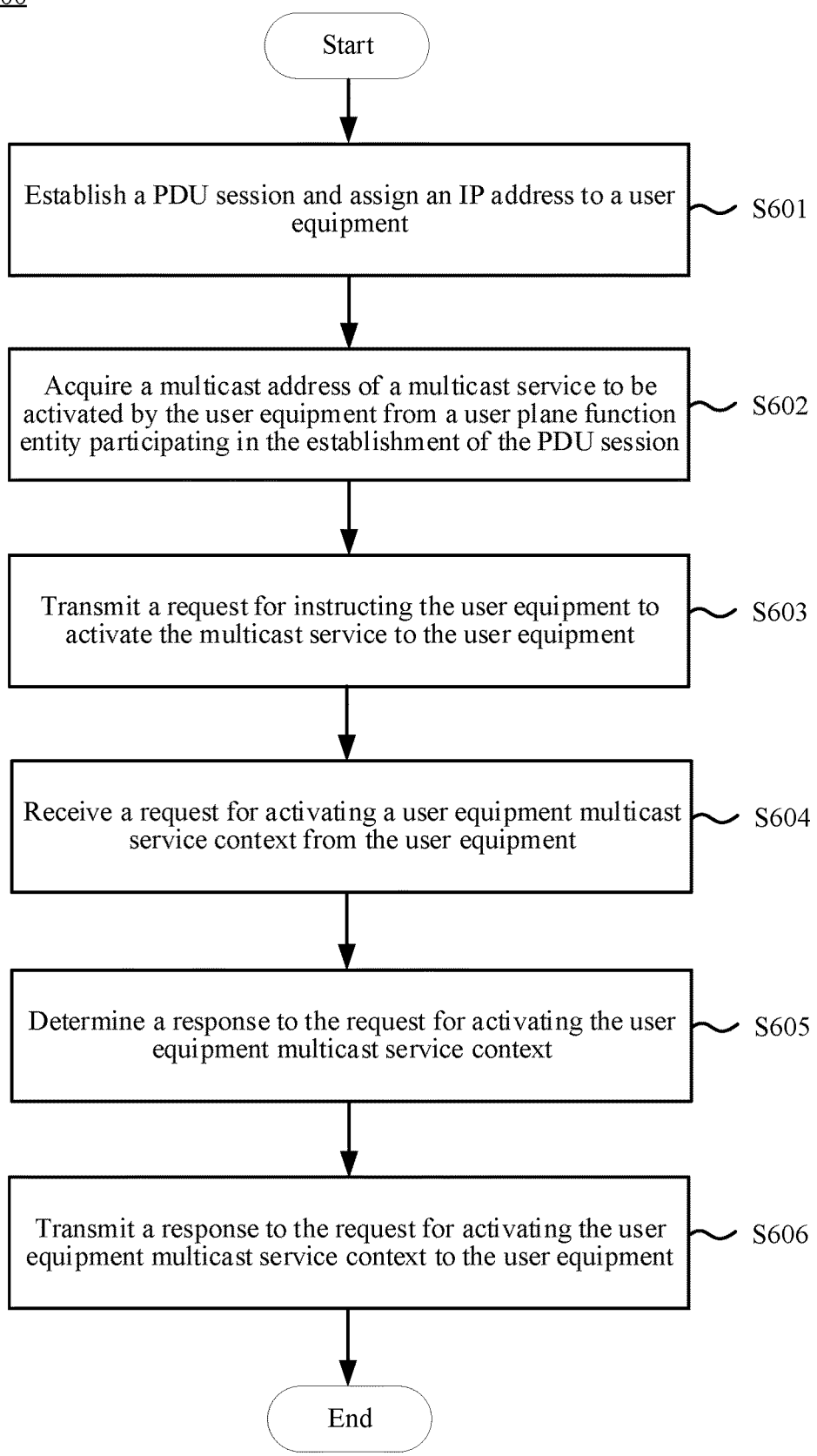
FIG. 6 is a flowchart of a method executed by a session management function entity when a user equipment activates a multicast service according to a second activation manner according to an embodiment of the present disclosure.

So far, the operations of the UE in the multicast service activation process have been described. As mentioned above, in the multicast service activation process, the SMF entity needs to provide the UE with the fourth identifier corresponding to the multicast service. The operations of the SMF entity in the multicast service activation process will be described below with reference to FIGS. 5-6. FIG. 5 is a flowchart of a method 500 executed by an SMF entity when a UE activates a multicast service according to a first activation manner according to an embodiment of the present disclosure. FIG. 6 is a flowchart of a method 600 executed by an SMF entity when a UE activates a multicast service according to a second activation manner according to an embodiment of the present disclosure.

First, the method 500 executed by the SMF entity when the UE activates the multicast service according to the first activation manner is described with reference to FIG. 5. As shown in FIG. 5, in step S501, a request for activating a user equipment multicast service context is received from a user equipment, where the user equipment multicast service context is established by the user equipment for activating a multicast service, the request for activating the user equipment multicast service context includes a third identifier and a multicast address of the multicast service, and the third identifier is used for identifying the user equipment multicast service context.

Specifically, first, the UE may transmit an uplink NAS transport (UL NAS Transport) message to an AMF entity, where the UL NAS Transport message includes at least three information elements, among which a first information element is a first identifier corresponding to the multicast service, a second information element is a second identifier corresponding to the multicast service, and a third information element is a request for activating an MBS UE Context. The request for activating the MBS UE Context includes the third identifier corresponding to the multicast service and the multicast address of the multicast service. In an example where the first identity is S-NSSAI, the second identity is DNN, and the third identifier is MBS UE Context ID, the UL NAS Transport message transmitted by the UE to the AMF entity may include three information elements, among which a first information element is the S-NSSAI corresponding to the multicast service, a second information element is the DNN corresponding to the multicast service, and a third information element is a request for activating the MBS UE Context. The request for activating the MBS UE Context includes the MBS UE Context ID corresponding to the multicast service and the multicast address of the multicast service.

In the present disclosure, the UE may encapsulate the "request for activating the MBS UE Context" described herein using a specific format. For example, the specific format may be an N1 interface-related session management container for the multicast service (N1 MBS SM Container).

Then, the AMF entity may select the corresponding SMF entity according to the first identifier and the second identifier corresponding to the multicast service. In an example where the first identifier is S-NSSAI and the second identifier is DNN, the AMF entity may select the corresponding SMF entity according to the S-NSSAI and the DNN corresponding to the multicast service.

Then, the AMF entity may transmit a request to the corresponding SMF entity through an Nsmf interface, where the request may be used for requesting to create an MBS UE Context related to an MBS session. This request may be represented as Nsmf_MBSSession_CreateMBSUEContext Request. The request may include the first identifier and the second identifier corresponding to the multicast service, and the "request for activating the MBS UE Context" described above. In an example where the first identifier is S-NSSAI, the second identifier is DNN, and the third identifier is MBS UE Context ID, the AMF entity may transmit a request to the SMF entity through the Nsmf interface, where the request may include the S-NSSAI corresponding to the multicast service, the DNN corresponding to the multicast service, and the "request for activating the MBS UE Context" described above.

In addition, according to an example of the present disclosure, the request transmitted by the AMF entity to the SMF entity may further include a dedicated identifier (e.g., a unique identifier) of the UE. For example, the dedicated identifier of the UE may be a Subscription Permanent Identifier (SUPI). In addition, according to another example of the present disclosure, the request transmitted by the AMF entity to the SMF entity may further include an identifier of a serving base station of the UE. For example, the identifier of the serving base station of the UE may be a corresponding RAN ID, and the RAN ID may be reported to the AMF entity by a RAN accessed by the UE. In addition, according to another example of the present disclosure, the request transmitted by the AMF entity to the SMF entity may further include both the dedicated identifier of the UE and the identifier of the serving base station of the UE, e.g., the SUPI of the UE and the corresponding RAN ID.

In addition, according to an example of the present disclosure, the SMF entity may record the identifier of the base station serving the user equipment in the user equipment multicast service context, so that the SMF entity acquires identifiers of base stations serving all user equipments that activate the multicast service through the SMF entity, for use in establishing a user plane of the MBS session. For example, the SMF entity may record the received RAN ID in the MBS UE Context of the UE.

Returning to FIG. 5, after step S501, in step S502, the SMF entity determines a response to the request for activating the user equipment multicast service context, the response including a fourth identifier corresponding to the multicast service, the fourth identifier indicating to the user equipment whether the multicast service is activated. For example, the SMF entity determines the fourth identifier corresponding to the multicast service at least according to the first identifier, the second identifier, and the multicast address of the multicast service, where the fourth identifier is an identifier assigned by an application function entity to the multicast service.

According to an example of the present disclosure, step S502 may include three sub-steps, namely step S5021, step S5022 and step S5023.

Specifically, in step S5021, the SMF entity may determine whether the user equipment is capable of using (or is configured to use) the multicast service. For example, the SMF entity may obtain subscription data of the UE from a unified data management (UDM) entity and determine whether the UE has subscribed to the multicast service. If the UE has subscribed to the multicast service, the SMF entity may determine that the UE is capable of using the multicast service. If the UE has not subscribed to the multicast service, the SMF entity may determine that the UE is not capable of using the multicast service.

When the SMF entity determines in step S5021 that the UE is capable of using the multicast service, the SMF entity may execute step S5022. In step S5022, the SMF entity transmits a notification to the application function entity, where the notification is an authorization request notification for the multicast service. The notification includes at least the first identifier, the second identifier, the multicast address of the multicast service, and an identifier of the session management function entity. The "identifier of the session management function entity" is used for the application function entity to acquire the session management function entity involved in activation of the multicast service by all user equipments that intend to activate the multicast service, for use during subsequently establishing a user plane corresponding to the multicast service.

Specifically, the SMF entity may directly transmit the notification to the application function entity. For example, the SMF entity may determine a corresponding AF entity according to the first identifier, the second identifier, and the multicast address of the multicast service. Then, the SMF entity may transmit a notification to the determined AF entity. The notification may include the first identifier, the second identifier, a dedicated identifier and a public identifier of the user equipment (e.g., a Generic Public Subscription Identifier (GPSI)), the multicast address of the multicast service, and the identifier of the session management function entity (e.g., an SMF ID and IP address of the SMF entity).

The SMF entity may transmit the notification to the application function entity through a network exposure function entity.

In an example where the SMF entity transmits the notification to the application function entity through the network exposure function entity, the SMF entity may transmit a notification to the network exposure function entity, where the notification may include the first identifier, the second identifier, the dedicated identifier and the public identifier (e.g., Generic Public Subscription Identifier (GPSI)) of the user equipment, the multicast address of the multicast service, the identifier of the session management function entity, and an identifier of the application function entity (e.g., an AF ID of the AF entity determined by the SMF entity), so that the network exposure function entity transmits another notification to the application function entity according to the identifier of the application function entity. The another notification may include the first identifier, the second identifier, the dedicated identifier and the public identifier of the user equipment, the multicast address of the multicast service, and the identifier of the session management function entity.

In an example where the first identifier is S-NSSAI, the second identifier is DNN, the dedicated identifier of the UE is SUFI, the public identifier of the UE is GPSI, the identifier of the session management function entity is SMF ID, and the identifier of the application function entity is AF ID, the SMF entity may transmit an authorization request notification for the MBS to an NEF entity through an Nsmf interface, where the notification may be represented as Nsmf_MBS AuthorizationRequest Notify, and the notification may include the S-NSSAI and the DNN corresponding to the multicast service, the dedicated identifier SUPI of the UE, the public identifier GPSI of the UE, the multicast address of the multicast service, the SMF ID, and the AF ID. In addition, the notification may also include other information, e.g., information related to a location of the UE, such as a Cell Global Identifier (CGI), Tracking Area Identity (TAI), Globally Unique AMF Identifier (GUAMI) etc.

Then, after receiving the notification, the network exposure function entity may determine the application function entity according to the identifier of the application function entity and transmit another notification to the application function entity. The another notification may include the first identifier, the second identifier, the public identifier of the user equipment, the multicast address of the multicast service, and the identifier of the session management function entity.

In an example where the first identifier is S-NSSAI, the second identifier is DNN, the dedicated identifier of the UE is SUPI, the public identifier of the UE is GPSI, the identifier of the session management function entity is SMF ID, and the identifier of the application function entity is AF ID, the NEF entity may transmit an authorization request notification for the MBS to the corresponding AF entity through an Nnef interface and according to the AF ID, where the notification may be represented as Nnef_MBS AuthorizationRequest Notify, and the notification may include the S-NSSAI and the DNN corresponding to the multicast service, the public identifier GPSI of the UE, the multicast address of the multicast service, and the SMF ID. In addition, the notification may also include other information, e.g., information related to the location of the UE, such as one or more of a CGI, TAI, GUAMI, or the like.

After step S5022, the AF entity may record the received SMF ID for use in establishing the user plane of the MBS session. In addition, the AF entity may further determine a fourth identifier corresponding to the multicast service. The fourth identifier described herein may be a Temporary Mobile Group Identity (TMGI) assigned by the AF entity to the multicast service activated based on the multicast address.

When the AF entity receives the message from the NEF entity, the fourth identifier may be the TMGI. Correspondingly, the AF entity may feed back a response message to the authorization request notification for the MBS to the NEF entity through an Nnef interface, where the response message may be represented as Nnef_MBS AuthorizationRequest Notify Response, and the response message may include the TMGI corresponding to the multicast service. Then, the NEF entity may feed back a response message to the authorization request notification for the MBS to the SMF entity through an Nsmf interface, where the response message may be represented as Nsmf_MBS AuthorizationRequest Notify Response, and the response message may include the TMGI corresponding to the multicast service.

Correspondingly, in step S5023, the SMF entity may receive a response to the notification in step S5022 from the application function entity, where the response to the notification includes the fourth identifier corresponding to the multicast service, so as to acquire the fourth identifier corresponding to the multicast service from the application function entity. In an example where the fourth identifier is a TMGI, the SMF entity may acquire the TMGI corresponding to the multicast service from the AF entity, or the SMF entity may acquire the TMGI corresponding to the multicast service from the AF entity through the NEF entity.

When the multicast service fails to be successfully authorized by the AF entity, the response message fed back by the AF entity does not include the TMGI, and may include a cause of the failure.

In addition, in the communication between the NEF entity and the AF entity described above, the message transmitted from the NEF entity to the AF entity may include an NEF transaction ID, and a response fed back by the AF entity to the NEF entity for this message may also include the NEF transaction identifier.

After step S5023, the SMF entity may create an MBS UE Context based on the above multicast address for the UE, and then may feed back a response message to the AMF entity, where the response message may be used as a response to the Nsmf_MBSSession_CreateMBSUEContext Request described above. The response message may be an acknowledgement of the Nsmf_MBSSession_CreateMBSUEContext Request described above, and may be represented as Nsmf_MBSSession_CreateMBSUEContext Response.

Then, in step S503, the SMF entity transmits a response to the request for activating the user equipment multicast service context to the user equipment, where the response includes the fourth identifier corresponding to the multicast service. For example, the SMF entity may transmit another request message to the AMF entity through an Namf interface, in response to the request for activating the MBS UE Context transmitted by the AMF entity to the SMF entity described above with reference to step S3022'. The another request message may include the fourth identifier corresponding to the multicast service. For example, the another request message may be transmitted through a message related to the N1 interface and communicated through the Namf interface, may be represented as Namf_Communication_N1MessageTransfer, and includes an Activate MBS UE Context Response, where the Activate MBS UE Context Response includes the fourth identifier corresponding to the multicast service. In an example where the fourth identifier is a TMGI, the Activate MBS UE Context Response includes a TMGI corresponding to the multicast service.

In the present disclosure, the SMF entity may encapsulate the "Activate MBS UE Context Response" described herein using a specific format. For example, the specific format may be an N1 interface-related session management container for the multicast service (N1 MBS SM Container).

So far, the method 500 executed by the SMF entity when the UE activates the multicast service according to the first activation manner has been described with reference to FIG. 5. Next, the method 600 executed by the SMF entity when the UE activates the multicast service according to the second activation manner will be described with reference to FIG. 6.

As shown in FIG. 6, in step S601, the SMF entity may establish a protocol data unit session, and assign an Internet Protocol address (IP address) to the user equipment. For example, in an example where the first identifier is S-NSSAI and the second identifier is DNN, the UE may transmit a PDU session establishment request to the network according to the S-NSSAI and the DNN corresponding to the multicast service, where the PDU session establishment request may include the S-NSSAI and the DNN corresponding to the multicast service. Then, the AMF entity may select one SMF entity from multiple SMF entities according to the S-NSSAI and the DNN corresponding to the multicast service. Then, the selected SMF entity may select one UPF entity from multiple UPF entities and assign an IP address to the UE.

Then, in step S602, a multicast address of a multicast service to be activated by the user equipment is acquired from a user plane function entity participating in the establishment of the protocol data unit session, where the multicast address is acquired after the user equipment transmits a data packet to a network including the user plane function entity according to the Internet Protocol address, the data packet is used for indicating the multicast service that the user equipment intends to activate, and a destination address of the data packet is the multicast address of the multicast service, or a protocol part of the data packet includes the multicast address of the multicast service.

Specifically, the UE may transmit a data packet to a network according to the acquired IP address, so that a user plane function entity in the network acquires the data packet. For example, the UE may transmit the data packet to the network according to the acquired Internet Protocol address, so that the user plane function entity participating in the establishment of the protocol data unit session in the network acquires the data packet. In addition, the data packet is used for indicating the multicast service that the user equipment intends to activate. A destination address of the data packet is the multicast address of the multicast service, or a protocol part of the data packet includes the multicast address of the multicast service. For example, the UE may transmit an IGMP Join data packet to the network based on the assigned IP address after completing the establishment of the PDU session. When IGMP version 1 or 2 is used, a destination IP address of the IGMP Join data packet may be the multicast address of the multicast service. When IGMP version 3 is used, an IGMP protocol part of the IGMP Join data packet may include the multicast address of the multicast service.

Correspondingly, the SMF entity may acquire a multicast address of a multicast service to be activated by the user equipment from the user plane function entity. For example, after detecting an IGMP Join data packet according to a packet detection rule (PDR) configuration of the SMF entity, the above UPF entity may report a multicast address corresponding to the IGMP Join data packet to the SMF entity (e.g., report the multicast address corresponding to the IGMP Join packet through an N4 session report message).

When the SMF entity decides to instruct the user equipment to activate the multicast service, the SMF entity may execute step S603. In step S603, the SMF entity may transmit a request for instructing the user equipment to activate the multicast service to the user equipment, where the request for instructing the user equipment to activate the multicast service includes a first identifier and a second identifier corresponding to the multicast service to be activated by the user equipment, and the multicast address of the multicast service. For example, the SMF entity may transmit the request for instructing the user equipment to activate the multicast service to the user equipment through the access and mobility management function entity.

For example, the SMF entity may transmit a message to the AMF entity through an Namf interface, where the message may be transmitted through a message related to the N1 interface and communicated through the Namf interface, and may be represented as Namf_Communication_N1MessageTransfer. The message may include the request for instructing the user equipment to activate the multicast service. For example, the request for instructing the user equipment to activate the multicast service may be a message for requesting MBS UE Context activation, so as to instruct the UE to activate the multicast service. The message for requesting MBS UE Context activation may include the S-NSSAI and the DNN corresponding to the multicast service to be activated by the user equipment, and the multicast address of the multicast service, and the message for requesting MBS UE Context activation may be represented as Request MBS UE Context Activation. In addition, the "Request MBS UE Context Activation" described herein may be encapsulated using the specific format described above (e.g., N1 MBS SM Container).

After step S603, the AMF entity may transmit a downlink NAS transport message related to an N2 interface to the RAN through the N2 interface. The downlink NAS transport message related to the N2 interface may be represented as N2 downlink NAS Transport. The downlink NAS transport message related to the N2 interface may include a downlink NAS transport (DL NAS Transport) message, where the DL NAS Transport message may include the above "Request MBS UE Context Activation" encapsulated by the N1 MBS SM Container. Through the downlink NAS transport message related to the N2 interface, the AMF entity may instruct the RAN to directly transmit the DL NAS Transport message to the UE. Then, the RAN may transmit the DL NAS Transport message described above to the UE. Correspondingly, the UE may acquire a first identity, a second identity, and a multicast address from the SMF entity through the DL NAS Transport message.

Then, in step S604, the SMF entity receives a request for activating a user equipment multicast service context from the user equipment, where the user equipment multicast service context is established by the user equipment for activating a multicast service, the request for activating the user equipment multicast service context includes a third identifier and a multicast address of the multicast service, and the third identifier is used for identifying the user equipment multicast service context. In step S605, the SMF entity determines a response to the request for activating the user equipment multicast service context, where the response includes a fourth identifier corresponding to the multicast service, and the fourth identifier is used for the user equipment to determine whether the multicast service is activated. In step S606, the SMF entity transmits the response to the user equipment.

The above step S604, step S605 and step S606 are respectively similar to the above step S501, step S502 and step S503, and will not be repeated here.

According to the method executed by a session management function entity according to the embodiments of the present disclosure, in the multicast service activation process, the session management function entity may receive, from a user equipment, a first identifier and a second identifier corresponding to a multicast service to be activated by the user equipment, a third identifier, and a multicast address of the multicast service, determine a fourth identifier corresponding to the multicast service at least according to such information, and feed back the fourth identifier to the user equipment, so that the user equipment activates the multicast service.

The above multicast service activation process is performed for each UE (i.e., per UE). That is to say, when multiple UEs intend to activate the same multicast service, each of the multiple UEs needs to go through the multicast service activation process described above.

After a multicast service is activated, service data corresponding to the multicast service (which may be briefly referred to as "multicast service data") may be transmitted to the UE. Generally, one multicast service can be activated for multiple UEs. Therefore, the multicast service data will be transmitted to each UE in a multicast manner. This process is performed for multiple UEs, and the multiple UEs may be regarded as a multicast group. That is to say, this process may be regarded as being performed for a multicast group (i.e., Per Group).

Therefore, "multicasting" means that the same content is transmitted to a plurality of user. The multicast mode can transmit data to all target entities at a time, and supports the transmission of data to only specific users. Similar to multicasting, broadcasting is also to transmit the same content to a plurality of users but does not allow for selection of users.

Before multicast/broadcast service data is transmitted to each UE, a corresponding user plane needs to be established. The establishment of the user plane will involve multiple entities in the network, for example, an AMF entity, an SMF entity, a UPF entity, a PCF entity, a NEF entity, an AF entity, etc. In addition, the establishment of the user plane takes into consideration a Policy Control and Charging (PCC) technology.

Figure 7:
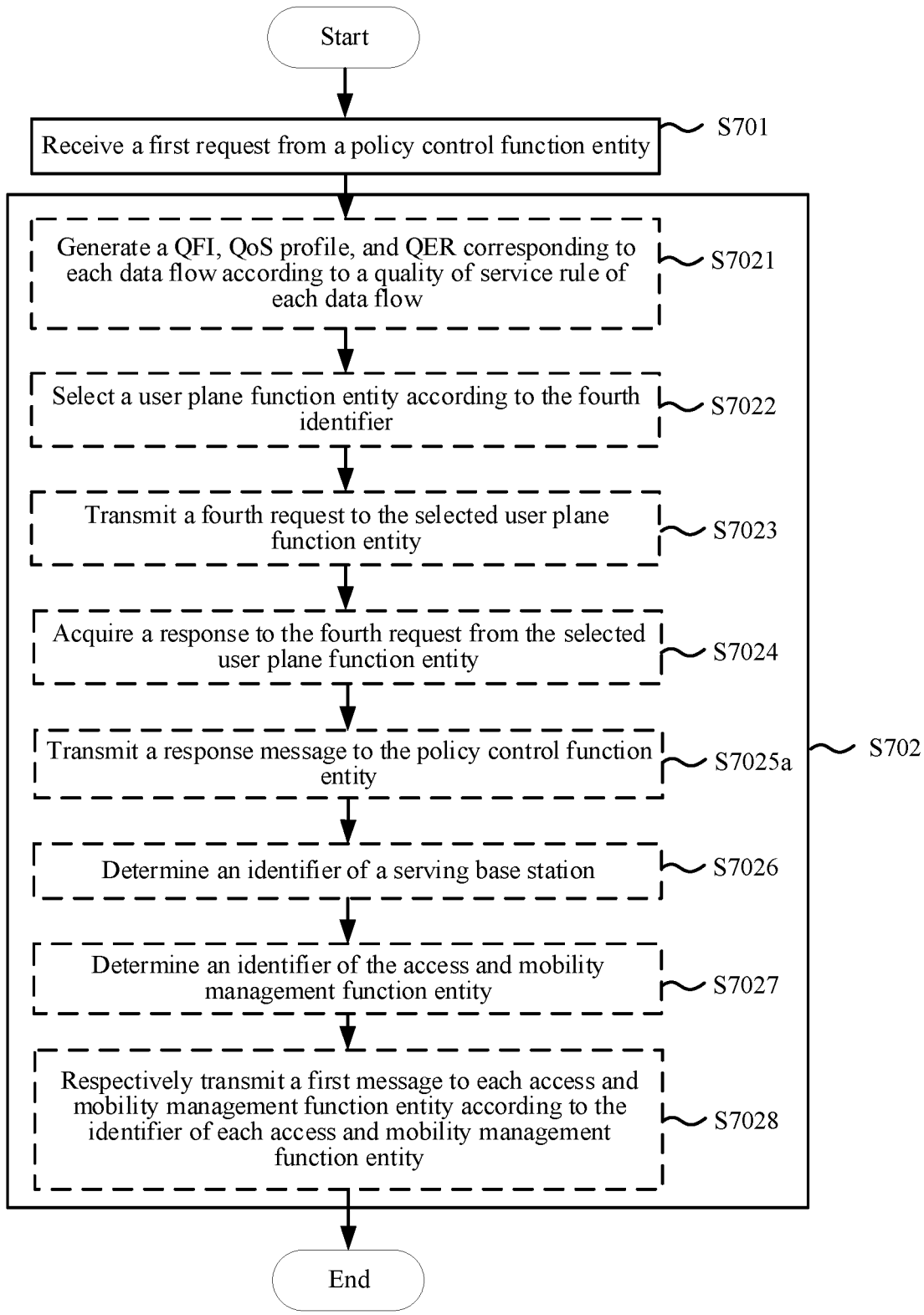
FIG. 7 is a flowchart of a method executed by a session management function entity for establishing a user plane according to an embodiment of the present disclosure.

The operations of the SMF entity in the process of establishing the user plane will be described below with reference to FIG. 7. FIG. 7 is a flowchart of a method 700 executed by an SMF entity for establishing a user plane according to an embodiment of the present disclosure.

As shown in FIG. 7, in step S701, the SMF entity receives a first request from a policy control function entity, the first request being used for requesting to start a multicast/broadcast service session (MBS Session), the first request including at least a fourth identifier corresponding to a multicast/broadcast service, a quality of service rule of at least one data flow corresponding to the multicast/broadcast service, and an identifier of the multicast/broadcast service session, and the fourth identifier being an identifier assigned by an application function entity to the multicast/broadcast service. In addition, for a broadcast service, the first request may further include a broadcast address of the broadcast service, a first identifier corresponding to the broadcast service (e.g., S-NSSAI used by the broadcast service), a second identifier corresponding to the broadcast service (e.g., a DNN used by the broadcast service), and a service area of the broadcast service (e.g., a geographic region such as a certain city).

According to an example of the present disclosure, the fourth identifier in the first request may be the TMGI described above. The identifier of the multicast/broadcast service session in the first request may be an ID of the multicast/broadcast service session. In addition, the first request may further include other information, for example, an estimated duration of the multicast/broadcast service session (estimated Session Duration), and a data transmission time of the multicast/broadcast service (time to MBS data transfer).

In addition, according to an example of the present disclosure, the PCF entity corresponding to the SMF entity may transmit a first request to the SMF entity through an Nsmf interface to request to start a multicast/broadcast service session. The first request may be represented as Nsmf_MBS SessionStart Request.

In addition, according to an example of the present disclosure, the first request in step S701 is determined by the policy control function entity according to a second request received from a network exposure function entity or an application function entity, and the second request is used for the network exposure function entity or the application function entity to request the policy control function entity to start a multicast/broadcast service session. The second request includes at least the fourth identifier, an identifier of the session management function entity, information of at least one data flow corresponding to the multicast/broadcast service, a quality of service requirement of the at least one data flow, the identifier of the multicast/broadcast service session, the estimated duration of the multicast/broadcast service session, and the data transmission time of the multicast/broadcast service.

In an example where the first request is determined by the policy control function entity according to the second request received from the application function entity, the AF entity may transmit the second request to the PCF entity through an Npcf interface to request to start the multicast/broadcast service session. The second request may be represented as Npcf_MBS SessionStart Request.

In addition, in an example where the first request is determined by the policy control function entity according to the second request received from a network exposure function entity, the NEF entity may transmit the second request to the PCF entity through an Npcf interface to request to start the multicast/Broadcast business session. The second request may be represented as Npcf_MBS SessionStart Request.

In the example where the first request is determined by the policy control function entity according to the second request received from the network exposure function entity, the second request is determined by the network exposure function entity according to a third request received from an application function entity, and the third request is used for the application function entity to request the network exposure function entity to start the multicast/broadcast service session. The third request includes at least the fourth identifier, an identifier of at least one session management function entity, information of at least one data flow corresponding to the multicast/broadcast service, a quality of service requirement of the at least one data flow, the identifier of the multicast/broadcast service session, the estimated duration of the multicast/broadcast service session, and the data transmission time of the multicast/broadcast service.

In this example, the AF entity may transmit the third request to the NEF entity through an Nnef interface to request to start the multicast/broadcast service session. The third request may be represented as Nnef_MBS SessionStart Request.

An exemplary process where the AF entity transmits a third request to the NEF entity, the NEF entity transmits a second request to the PCF entity, and the PCF entity transmits a first request to the SMF entity is given below.

Specifically, first, the AF entity transmits a third request (Nnef_MBS SessionStart Request) to the NEF entity, where the third request may include a TMGI corresponding to the multicast/broadcast service, at least one SMF ID, information of at least one data flow, a quality of service requirement of the at least one data flow, the ID of the multicast/broadcast service session, the estimated duration of the multicast/broadcast service session, and the data transmission time of the multicast/broadcast service.

In an example where there are multiple PCF entities and each PCF entity corresponds to one or more SMF entities, the PCF entity is determined by the NEF or the AF entity according to the identifier of the SMF entity. For example, the NEF entity or the AF entity may determine the PCF entity corresponding to the SMF ID based on the SMF ID according to a network configuration.

Then, the NEF entity may transmit a second request (Npcf_MBS SessionStart Request) to the corresponding PCF entity according to the SMF ID, where the second request may include the TMGI corresponding to the multicast/broadcast service, the SMF ID, the information of the at least one data flow corresponding to the multicast/broadcast service, the quality of service requirement of the at least one data flow, the ID of the multicast/broadcast service session, the estimated duration of the multicast/broadcast service session, and the data transmission time of the multicast/broadcast service. In this case, the message transmitted from the NEF entity to the PCF entity contains one SMF ID. In addition, in this case, when each PCF entity corresponds to multiple SMF entities, the NEF entity needs to transmit multiple second requests to the PCF entity according to the SMF IDs of the multiple SMF entities, where each second request includes one of the SMF IDs. Therefore, subsequently the PCF entity does not need to transmit the first request message to each SMF entity.

The NEF entity may transmit a second request (Npcf_MBS SessionStart Request) to the corresponding PCF entity according to the SMF ID, where the second request may include the TMGI corresponding to the multicast/broadcast service, an SMF ID list, the information of the the at least one data flow corresponding to the multicast/broadcast service, the quality of service requirement of the at least one data flow, the ID of the multicast/broadcast service session, the estimated duration of the multicast/broadcast service session, and the data transmission time of the multicast/broadcast service. In this case, the message transmitted from the NEF entity to the PCF entity contains multiple SMF IDs. Therefore, subsequently the PCF entity needs to transmit the first request message to the multiple SMF entities respectively.

Finally, the PCF entity may transmit a first request (Nsmf_MBS SessionStart Request) to the corresponding SMF entity according to the SMF ID, where the first request may include the TMGI corresponding to the multicast/broadcast service, a quality of service rule of the at least one data flow, the ID of the multicast/broadcast service session, the estimated duration of the multicast/broadcast service session, and the data transmission time of the multicast/broadcast service. In addition, for a broadcast service, the first request may further include a broadcast address of the broadcast service, S-NSSAI and DNN used by the broadcast service, and a service area of the broadcast service.

In addition, the "at least one SMF ID" in the third request described above is all SMF IDs based on which all UEs in the multicast group activate the MBS UE Context. When different UEs correspond to identical SMF IDs, the AF entity may regard these identical SMF IDs as one SMF ID. For the broadcast service, the "at least one SMF ID" in the third request described above is a list of SMF IDs configured in the AF according to the broadcast address of the broadcast service, or a list of SMF IDs determined according to the service area of the broadcast service.

In addition, the "information of at least one data flow corresponding to the multicast/broadcast service" in the third request described above may be information of all data flows to be used for transmitting the multicast/broadcast service. The data flow herein may be an IP flow. In this case, the information of each data flow may be determined by an IP 3-tuple. The IP 3-tuplet may indicate a destination IP address of an IP flow being a multicast/broadcast address, a destination port, and a communication protocol used (such as the UDP protocol). In some other examples of the present disclosure, the information of each data flow may be determined by an IP 5-tuple, or may be determined by other 3-tuples, which is not limited in the present disclosure.

In addition, the "quality of service requirement of the at least one data flow" in the third request described above may include a quality of service requirement (QoS Requirement) corresponding to each data flow. The quality of service requirement corresponding to each data flow may include one or more of a QoS Class Identifier (QCI), an Allocation Retention Priority (ARP), a Priority Level, etc. In addition, the quality of service requirement corresponding to each data flow may be used for generating a quality of service rule of each data flow in the first request. The specific generation method may be one of existing generation methods, and is not limited in the present disclosure.

In addition, any one of the first request, the second request, and the third request described above may further include an aggregate maximum rate corresponding to the multicast/broadcast service. The aggregate maximum rate may have a value in the downlink direction, but not in the uplink direction. The aggregate maximum rate may have both a value in the downlink direction and a value in the uplink direction. The aggregate maximum rate may be an Aggregate Maximum Bit Rate (AMBR).

Returning to FIG. 7, after step S701, in step S702, the SMF entity performs the multicast/broadcast service session according to the first request. Through step S702, a user plane corresponding to the multicast/broadcast service may be established, and transmissions between network nodes (e.g., the UPF entity and the RAN) in the user plane are tree-like (that is, a transmission tree among the network nodes is established). Step S702 will be described in detail below.

According to an example of the present disclosure, step S702 may include 8 sub-steps, namely steps S7021 to S7028.

Specifically, in step S7021, the SMF entity may generate a quality of service flow identity (QoS Flow Identity, QFI) corresponding to each data flow, a quality of service flow profile (QoS Profile), and a quality of service flow enforcement rule (QoS Enforcement Rule, QER) according to the quality of service rule of each data flow in the at least one data flow corresponding to the multicast/broadcast service). In the present disclosure, the quality of service flow identity corresponding to each data flow may also be referred to as a quality of service flow identity of the multicast/broadcast service (MBS QFI). In addition, the quality of service enforcement rule described herein may be similar to a N4 QER rule.

Then, in step S7022, the SMF entity may select a user plane function entity according to the fourth identifier. In an example where the fourth identifier is a TMGI, for a multicast service, the SMF entity may determine a corresponding MBS UE Context according to the TMGI, and according to the determined MBS UE Context, acquire S-NSSAI, a DNN, and a multicast address contained in the MBS UE Context. For a broadcast service, the first request message includes a broadcast address of the broadcast service, S-NSSAI and a DNN used by the broadcast service, and a service area of the broadcast service. Then, the SMF entity may select one UPF entity from multiple UPF entities according to the acquired S-NSSAI, DNN, and multicast/broadcast address.

Then, in step S7023, the SMF entity may transmit a fourth request to the selected user plane function entity, where the fourth request is used for establishing a transmission resource for the multicast/broadcast service session. The fourth request includes at least a multicast/broadcast address of the multicast/broadcast service, a quality of service enforcement rule of the at least one data flow corresponding to the multicast/broadcast service, and an aggregate maximum rate (e.g., AMBR) corresponding to the multicast/broadcast service. For example, the SMF entity may transmit a request for requesting to establish an MBS session to the selected UPF entity through the N4 interface, where the request may be represented as N4 MBS Session Establishment Request.

Then, in step S7024, the SMF entity may acquire a response to the fourth request from the selected user plane function entity, where the response to the fourth request includes a tunnel multicast address assigned by the selected user plane function entity for transmitting service data corresponding to the multicast/broadcast service and a fifth identifier corresponding to the tunnel multicast address, the tunnel multicast address is used for multicast tunnel transmission between network entities, and the fifth identifier is used for identifying a transmission tunnel of the multicast/broadcast service (e.g., a GTP-related transmission tunnel).

For example, the UPF entity may establish a GTP user plane tunnel transmission tree from the UPF entity to the RAN based on a multicast routing protocol according to the received request, so as to transmit data to be transmitted by the UPF entity to the RAN (e.g., service data corresponding to the multicast/broadcast service) in the form of a tree-like GTP user plane tunnel. Then, the UPF entity may assign a tunnel multicast address for transmitting the service data corresponding to the multicast/broadcast service. Specifically, the UPF entity may assign the multicast/broadcast service a multicast address passing through a GTP user plane tunnel of an N3 interface, and use the assigned multicast address of the GTP user plane tunnel as the tunnel multicast address. The "tunnel multicast address" described herein may also be referred to as a transport layer IP multicast address (Transport IP Multicast Address). Then, the UPF entity may assign a fifth identifier, for example, a Common-Tunnel End point ID (C-TEID), to the multicast/broadcast service.

After the UPF entity assigns the tunnel multicast address and the fifth identifier to the multicast/broadcast service, the UPF entity may transmit a response message to the SMF entity through an N4 interface, in response to the request transmitted by the SMF entity to the UPF entity for requesting to establish the MBS session. The response message may include the tunnel multicast address corresponding to the multicast/broadcast service and the fifth identifier corresponding to the multicast/broadcast service. The response message may be represented as N4 MBS Session Establishment Response.

Correspondingly, the SMF entity may acquire the tunnel multicast address corresponding to the multicast/broadcast service from the selected UPF entity, and acquire the fifth identifier corresponding to the multicast/broadcast service from the selected user plane function entity. Alternatively, the SMF entity may acquire a tunnel multicast address and a tunnel identifier corresponding to the multicast/broadcast service assigned by the selected user plane function entity according to a network configuration. Then, for the multicast service, the SMF entity may record the tunnel multicast address and the fifth identifier in each user equipment multicast service context of the multicast service that is already activated. For the broadcast service, the SMF entity may record the tunnel multicast address and the fifth identifier in a broadcast service session context corresponding to the broadcast service. For the broadcast service, there is not a broadcast service session context for each UE (that is, Per UE), but there is one entity-level broadcast service session context on the SMF entity. For different broadcast services, different broadcast service session contexts may exist.

It is to be understood that in the present disclosure, the tunnel multicast address and the fifth identifier assigned by the UPF entity uniquely correspond to the multicast/broadcast address of the multicast/broadcast service.

It is to also be understood that in the present disclosure, the tunnel multicast address assigned by the UPF entity may be regarded as a tunnel multicast address assigned by a core network (CN), and the fifth identifier allocated by the UPF entity may be regarded as a fifth identifier assigned by the CN.

In the present disclosure, transmission channels of data flows corresponding to different multicast/broadcast services may be distinguished by different fifth identifiers, and multiple data flows corresponding to each multicast/broadcast service may be distinguished by the QFIs described above.

In addition, the UPF entity may also establish a transport tree from the AF entity to the UPF entity. That is to say, the transmission from the AF entity to the UPF entity may also adopt a transport layer multicast manner. The multicast transmission from the AF entity to the UPF entity may also be achieved by a routing apparatus (e.g., router) between the AF entity and the UPF entity.

In addition, when the SMF entity corresponds to multiple UPF entities, the SMF entity may execute the above steps S7022 to S7024 for each UPF entity.

In addition, according to an example of the present disclosure, steps S7022 to S7024 may also be replaced with steps S7022' to S7024' (not shown in the figure). In step S7022', the SMF entity may select a user plane function entity according to the fourth identifier. Then, in step S7023', the SMF entity may transmit a fourth request to the selected user plane function entity, where the fourth request is used for establishing a transmission resource for the multicast/broadcast service session, and the fourth request includes a tunnel multicast address assigned by the session management function entity for transmitting service data corresponding to the multicast/broadcast service and a fifth identifier corresponding to the tunnel multicast address, the tunnel multicast address is used for multicast tunnel transmission between network entities, and the fifth identifier is used for identifying a transmission tunnel of the multicast/broadcast service. Then, in step S7024', the SMF entity may acquire a response to the fourth request from the selected user plane function entity, where the response to the fourth request is an acknowledgment of the fourth request. That is to say, the tunnel multicast address described herein may be assigned by the SMF entity and notified by the SMF entity to the selected UPF entity.

In addition, in this example, the fourth request may also include a multicast/broadcast address of the multicast/broadcast service, a quality of service enforcement rule of the at least one data flow corresponding to the multicast/broadcast service, and an aggregate maximum rate (e.g., AMBR) corresponding to the multicast/broadcast service.

In addition, similarly, for the multicast service, the SMF entity may record the tunnel multicast address and the fifth identifier in each user equipment multicast service context of the multicast service that is already activated. For the broadcast service, the SMF entity may record the tunnel multicast address and the fifth identifier in a broadcast service session context corresponding to the broadcast service. In addition, when the SMF entity corresponds to multiple UPF entities, the SMF entity may execute the above steps S7022' to S7024' for each UPF entity.

The SMF entity may determine, according to the network configuration, whether to execute step S7025a immediately after step S7024 or S7024', or to execute step S7025b after "the AMF entity may transmit a notification message to the SMF entity" to be described later. In step S7025a/S7025b, the SMF entity may transmit a response message to the PCF entity in response to the first request transmitted by the PCF entity to the SMF entity described in step S701. For example, the response message may be an acknowledgment of the "Nsmf_MBS SessionStart Request" transmitted by the PCF entity to the SMF entity described in step S701, and the response message may be represented as Nsmf_MBS SessionStart Response.

In addition, after step S7025a/S7025b, the PCF entity may transmit a response message to the NEF entity in response to the second request transmitted by the NEF entity to the PCF entity described in step S701. For example, the response message may be an acknowledgment of the "Npcf_MBS SessionStart Request" transmitted by the NEF entity to the PCF entity described in step S701, and the response message may be represented as Npcf_MBS SessionStart Response.

Then, in step S7026, for the multicast service, the SMF entity may determine an identifier (e.g., RAN ID) of at least one serving base station according to each user equipment multicast service context of the multicast/broadcast service that is already activated. As described above, in the multicast service activation process, the SMF entity may record an identifier of a serving base station of a UE that activates the multicast service in an MBS UE Context of the UE. Therefore, in step S7026, the SMF entity may acquire all RAN IDs from each user equipment multicast service context of the multicast service that is already activated. For the broadcast service, the SMF entity may determine an identifier (e.g., RAN ID) of at least one serving base station according to the service area of the broadcast service.

Then, in step S7027, for the multicast service, the SMF entity may respectively determine an identifier of a corresponding access and mobility management function entity according to the identifier of each serving base station. For example, the SMF entity may acquire a corresponding AMF ID from the MBS UE Context corresponding to each RAN ID. For the broadcast service, the SMF entity may determine an AMF ID corresponding to each RAN ID according to network configuration information.

Then, in step S7028, the SMF entity may respectively transmit a first message to each access and mobility management function entity according to the identifier of the each access and mobility management function entity, where the first message includes at least the identifier of the corresponding serving base station, the fourth identifier, an aggregate maximum rate (e.g., AMBR) corresponding to the multicast/broadcast service, a quality of service flow identity and a quality of service profile corresponding to each data flow, the fifth identifier, and the tunnel multicast address, so that each access and mobility management function entity transmits a fifth request to the corresponding serving base station, where the fifth request is used for requesting to start a multicast/broadcast service session. The fifth request includes the first identifier, the fourth identifier, the quality of service flow identity and the quality of service profile corresponding to each data flow, the fifth identifier, and the tunnel multicast address.

For example, the SMF entity may transmit an MBS message transfer related to the N2 interface and communicated through an Namf interface to the AMF entity through an Namf interface, which may be represented as Namf_Communication_N2MBSMessageTransfer, and may include a RAN ID, a TMGI, the aggregate maximum rate (e.g., AMBR) corresponding to the multicast/broadcast service, the quality of service flow identity and the quality of service profile corresponding to each data flow of the multicast/broadcast service, and a CN N3 C-TEID and CN N3 tunnel multicast address corresponding to the multicast/broadcast service. In addition, the TMGI, the quality of service flow identity and the quality of service profile corresponding to each data flow of the multicast/broadcast service, and the CN N3 C-TEID and CN N3 tunnel multicast address corresponding to the multicast/broadcast service may be encapsulated using a specific format. For example, the specific format may be an N2 interface-related session management container for the multicast/broadcast service (N2 MBS SM Container).

Steps S7027 and S7028 are performed by the SMF entity for each serving base station. In addition, in the present disclosure, different RAN IDs may correspond to a same AMF ID.

After step S7028, each access and mobility management function entity may transmit a fifth request to the corresponding serving base station, where the fifth request includes the first identifier, the fourth identifier, the aggregate maximum rate (e.g., AMBR) corresponding to the multicast/broadcast service, the quality of service flow identity and the quality of service profile corresponding to each data flow of the multicast/broadcast service, the fifth identifier, and the tunnel multicast address. For example, the AMF entity may transmit a request for requesting to start an MBS session to the RAN through an N2 interface, where the request may be represented as N2 MBS Session Start Request, and may include the S-NSSAI and TMGI corresponding to the multicast/broadcast service, the aggregate maximum rate (e.g., AMBR) corresponding to the multicast/broadcast service, the quality of service flow identity and the quality of service profile corresponding to each data flow of the multicast/broadcast service, the CN N3 C-TEID corresponding to the multicast/broadcast service, and the CN N3 tunnel multicast address corresponding to the multicast/broadcast service.

Then, the serving base station may transmit a response message to the AMF entity in response to the fifth request. For example, the RAN may transmit the response message to the AMF entity through the N2 interface in response to the request transmitted by the AMF entity to the RAN for requesting to start an MBS session. The response message may be an acknowledgment of the N2 MBS Session Start Request transmitted by the AMF entity to the RAN, and may be represented as N2 MBS Session Start Response.

Then, the serving base station may allocate resources for transmitting MBS service data to UEs served by the serving base station, to support data flows with different quality of service requirements. Accordingly, the UEs may receive the MBS service data through the allocated resources.

Then, the serving base station may join a transport group corresponding to the tunnel multicast address (e.g., CN N3 tunnel multicast address) described above, and receive the MBS service data from the UPF entity. That is to say, a transmission tree from the UPF entity to the serving base station may be established to transmit data (e.g., MBS service data) to be transmitted by the UPF entity to the serving base station in a tree-like manner.

Then, the AMF entity may transmit a notification message to the SMF entity to notify the message transmitted by the SMF entity to the AMF entity described above in the step S7028. For example, the AMF entity may transmit the notification information to the SMF entity through the Namf interface. The notification information may be an acknowledgment of the message transmitted by the SMF entity to the AMF entity described in the above step S7028. The notification information may be transmitted through an MBS message related to the N2 interface and communicated through the Namf interface, and may be represented as Namf_Communication_N2MBSMessageNotify.

Then, when the NEF entity receives the response messages of all the PCF entities, or after a preset time after the NEF entity receives the response messages of all the PCF entities, the NEF entity may transmit a response message to the AF entity in response to the third request transmitted by the AF entity to the NEF entity described in the above step S701. For example, the NEF entity may transmit the response message to the AF entity through the Nnef interface, and the response message may be represented as Nnef_MBS SessionStart Response. In addition, the response message may include a first list and a second list. The first list may be a list of SMF IDs of SMF entities that have successfully established a user plane corresponding to the multicast/broadcast service. The second list may be a list of SMF IDs of SMF entities that have not successfully established a user plane corresponding to the multicast/broadcast service.

Then, when the AF entity receives the response message from the NEF entity, or after a preset time after the AF entity receives the response message from the NEF entity, the above process for establishing a user plane corresponding to the multicast/broadcast service may be executed again for the SMF entities corresponding to the SMF IDs in the second list.

So far, the user plane corresponding to the multicast/broadcast service has been successfully established. This means that the multicast/broadcast service may be started. For example, the AF entity may transmit multicast/broadcast service data (e.g., MBS data packets) whose destination IP address is the multicast/broadcast address of the multicast/broadcast service to the downstream UPF entities. Then, the UPF entities may transmit the multicast/broadcast service data to the RANs by the transport layer multicast method described above. Then, the RANs may transmit the multicast/broadcast service data to the UEs through the resources allocated to the UEs.

According to the method executed by a session management function entity according to the embodiments of the present disclosure, the session management function entity may receive a request for requesting to start a multicast/broadcast service session from a policy control function entity, where the request may include a fourth identifier corresponding to a multicast/broadcast service, a quality of service rule of at least one data flow corresponding to the multicast/broadcast service, and an identifier of the multicast/broadcast service session; and the session management function entity may perform the multicast/broadcast service session according to the request to transmit multicast/broadcast service data, thereby realizing the application of the PCC technology to the transmission of multicast/broadcast service data, and achieving the integration of PCC with the transmission of multicast/broadcast service data.

Figure 8:
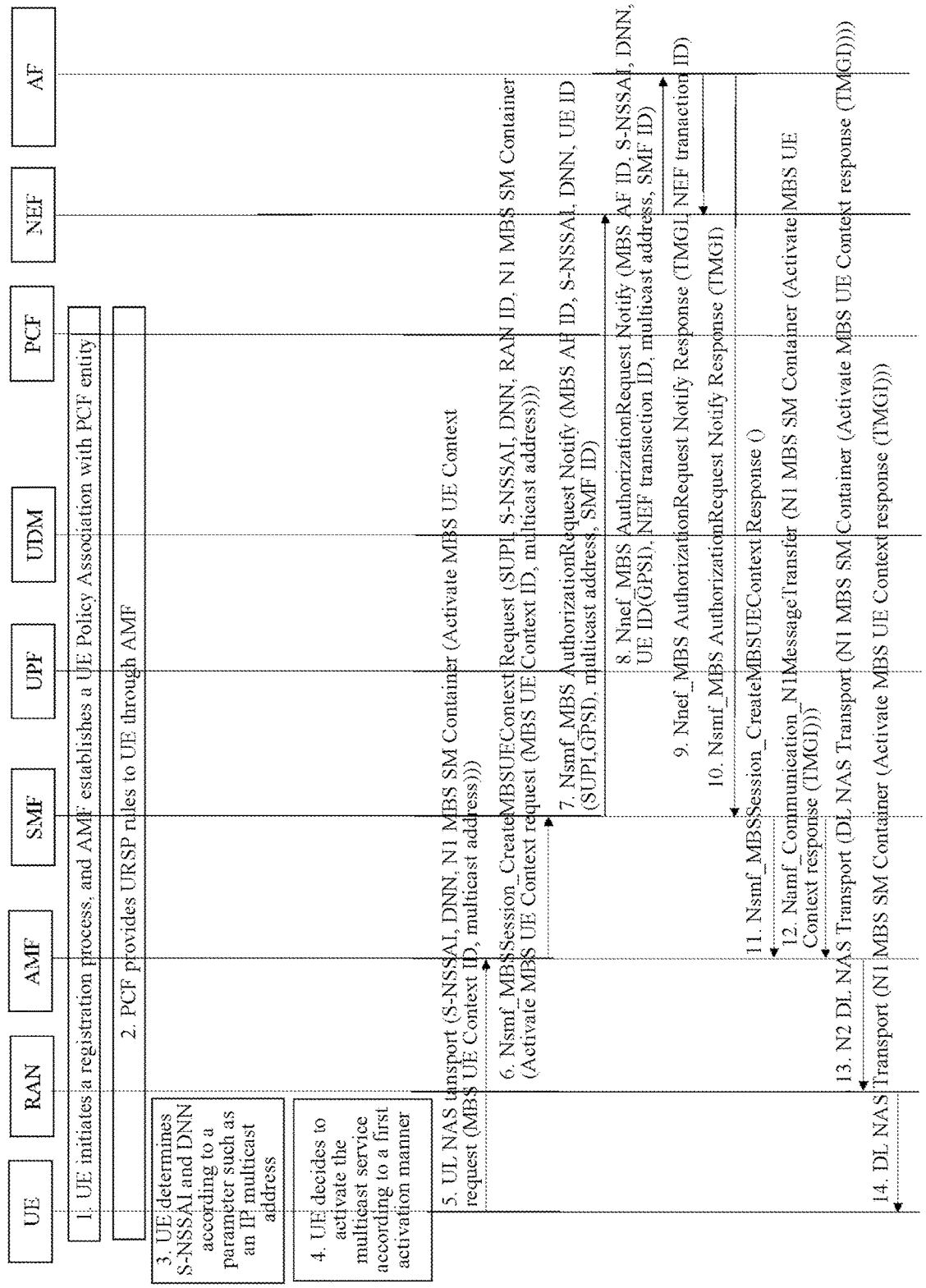
FIG. 8 shows a schematic process of activating a multicast service based on a first activation manner in a wireless communication system according to an embodiment of the present disclosure.
Figure 9:
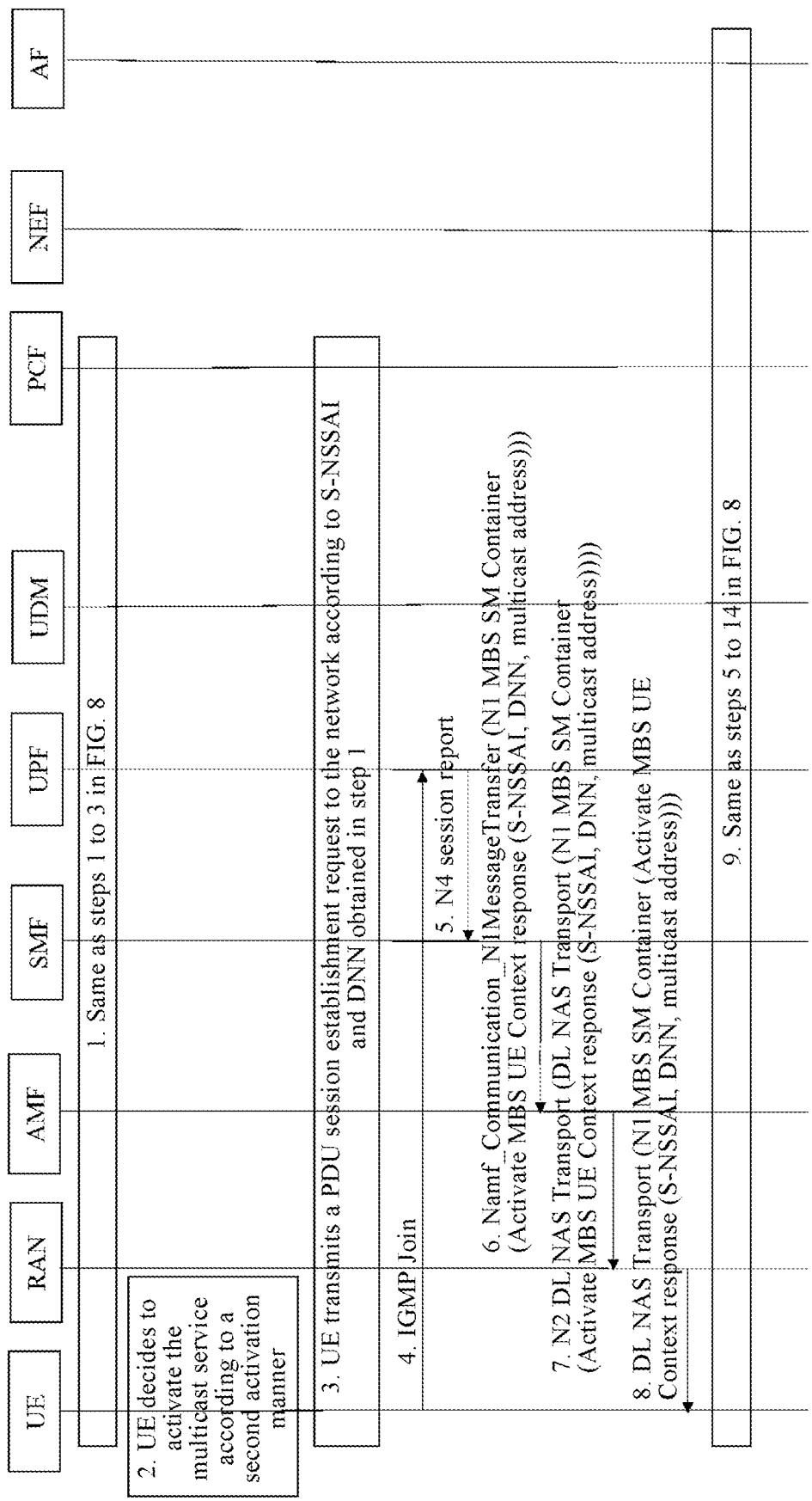
FIG. 9 shows a schematic process of activating a multicast service based on a second activation manner in a wireless communication system according to an embodiment of the present disclosure.
Figure 10:
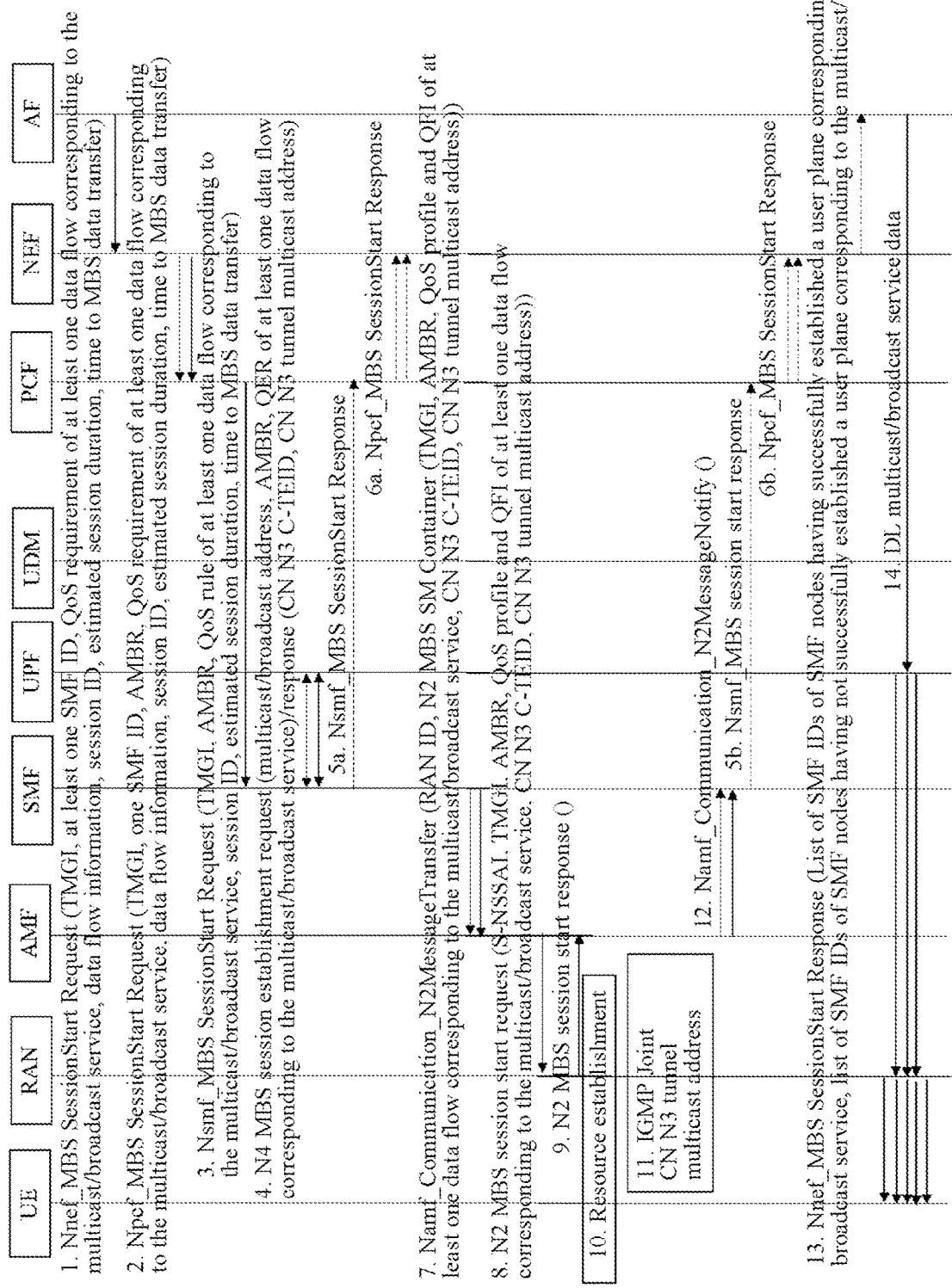
FIG. 10 shows a schematic process of establishing a user plane corresponding to a multicast/broadcast service in a wireless communication system according to an embodiment of the present disclosure.

Schematic processes of activating a multicast service in a wireless communication system and establishing a user plane corresponding to a multicast/broadcast service according to the embodiments of the present disclosure will be described below with reference to FIGS. 8-10. FIG. 8 shows a schematic process of activating a multicast service based on a first activation manner in a wireless communication system according to an embodiment of the present disclosure. FIG. 9 shows a schematic process of activating a multicast service based on a second activation manner in a wireless communication system according to an embodiment of the present disclosure. FIG. 10 shows a schematic process of establishing a user plane corresponding to a multicast/broadcast service in a wireless communication system according to an embodiment of the present disclosure.

First, a specific process of activating a multicast service based on a first activation manner in a wireless communication system will be described with reference to FIG. 8.

As shown in FIG. 8, in step 1, a UE may initiate a registration process to a network, and an AMF entity establishes a UE Policy Association with a PCF entity.

Then, in step 2, in the process of establishing the UE policy association between the AMF entity and the PCF entity, the PCF entity may provide multiple URSP rules to the UE through the AMF entity, where each URSP rule corresponds to one multicast service and each URSP rule includes at least a multicast address of the corresponding multicast service.

Then, in step 3, the UE intends to activate a multicast service, and may query the related URSP rule according to the multicast address of the multicast service to obtain a route selection descriptor, where the route selection descriptor includes an S-NSSAI and a DNN.

Then, in step 4, the UE decides to activate the multicast service according to a first activation manner (i.e., by optimizing a multicast service activation manner).

Then, in step 5, the UE initiates a multicast service activation process to the multicast address of the multicast service. The UE may assign an MBS UE Context ID to an MBS UE Context established for activating the multicast service. In addition, the UE may transmit an uplink NAS transport (UL NAS Transport) message to the AMF entity, where the message includes three information elements, among which a first information element is the S-NSSAI obtained in step 3, a second information element is the DNN obtained in step 3, and a third information element is a request for activating the MBS UE Context. The request for activating the MBS UE Context includes the MBS UE Context ID corresponding to the multicast service and the multicast address of the multicast service. In addition, the UE may encapsulate the request for activating the MBS UE Context by using an N1 interface-related session management container for the multicast service (N1 MBS SM Container).

Then, in step 6, the AMF entity may select an SMF entity according to the received S-NSSAI and DNN, and transmit a request for creating an MBS UE Context related to an MBS session to the selected SMF entity through an Nsmf interface (Nsmf_MBSSession_CreateMBSUEContext Request), where the request includes the S-NSSAI corresponding to the multicast service, the DNN corresponding to the multicast service, the "request for activating the MBS UE Context" encapsulated by the N1 MBS SM Container described above, and an SUPI and GPSI of the UE, and a corresponding RAN ID. The SMF entity may record the RAN ID in the MBS UE Context of the UE, so that subsequently the SMF entity acquires identifiers of serving base stations of all user equipments that activate the multicast service through the SMF entity, to establish a user plane corresponding to the multicast service.

Then, in step 7, the SMF entity may determine whether the UE is capable of using the multicast service according to subscription data of the UE obtained from a UDM entity (where interaction between the SMF entity and the UDM entity is not shown in the figure). If the UE is capable of using the multicast service, the SMF entity may determine an AF entity according to the received S-NSSAI, DNN, and multicast address. Then, the SMF entity may first transmit an authorization request notification for the MBS (Nsmf_MBS AuthorizationRequest Notify) to an NEF entity through an Nsmf interface, where the notification may include the S-NSSAI and the DNN corresponding to the multicast service, the dedicated identifier SUPI of the UE, the public identifier GPSI of the UE, the multicast address of the multicast service, the SMF ID, the AF ID, and information related to a location of the UE (CGI, TAI, GUAMI, etc.). The SMF ID in this notification may be recorded by the AF entity for use in the establishment of the user plane of the MBS session. In addition, the AF ID in the notification may be used for the NEF entity to determine the corresponding AF entity.

Then, in step 8, the NEF entity may transmit an authorization request notification for the MBS (Nnef_MBS AuthorizationRequest Notify) to the corresponding AF entity through an Nnef interface according to the received AF ID, where the notification may include the S-NSSAI and the DNN corresponding to the multicast service, the public identifier GPSI of the UE, the multicast address of the multicast service, the SMF ID, and the information related to the location of the UE (CGI, TAI, GUAMI, etc.).

Then, in step 9, the AF may record the SMF ID in the received message for use in the establishment of the user plane corresponding to the multicast service. If the AF entity receives the message from the SMF entity, the AF entity may return a response message (Nsmf_MBS AuthorizationRequest Notify Response) to the authorization request notification for the MBS to the SMF entity through an Nsmf interface, where the response message may include the TMGI corresponding to the multicast service. If the AF entity receives the message from the NEF entity, the AF entity may return a response message (Nnef_MBS AuthorizationRequest Notify Response) to the authorization request notification for the MBS to the NEF entity through an Nnef interface, where the response message may include the TMGI corresponding to the multicast service. In addition, when the multicast service fails to be successfully authorized by the AF entity, the response message fed back by the AF entity does not include the TMGI, and may include a cause of the failure.

Then, in step 10, the NEF entity may feed back a response message (Nsmf_MBS AuthorizationRequest Notify Response) to the authorization request notification for the MBS to the SMF entity through an Nsmf interface, where the response message may include the TMGI corresponding to the multicast service.

Then, in step 11, the SMF entity may create an MBS UE Context based on the above multicast address for the UE, and then may feed back a response message to the AMF entity, where the response message may be used as a response (Nsmf_MBSSession_CreateMBSUEContext Response) to the Nsmf_MBSSession_CreateMBSUEContext Request described above.

Then, in step 12, the SMF entity decides to reply to the request from the UE, and transmits another request message (Namf_Communication_N1MessageTransfer) to the AMF entity through an Namf interface. The another request message includes an Activate MBS UE Context Response, where the Activate MBS UE Context Response may include the TMGI corresponding to the multicast service. Because it is not necessary to establish a user plane corresponding to the multicast service, the another request message does not include an N2 MBS session container provided by the SMF entity to the RAN.

Then, in step 13, the AMF entity may transmit a downlink NAS transport message related to an N2 interface (N2 downlink NAS Transport) to the RAN through the N2 interface. The downlink NAS transport message related to the N2 interface may include a downlink NAS transport (DL NAS Transport) message, where the DL NAS Transport message includes an information element, that is, the "Activate MBS UE Context Response (TMGI)" described above. Through the downlink NAS transport message related to the N2 interface, the AMF entity may instruct the RAN to directly transmit the DL NAS Transport message to the UE. The "Activate MBS UE Context Response" included in the DL NAS Transport message described herein may also be encapsulated by the N1 MBS SM Container.

Then, in step 14, the RAN may transmit the DL NAS Transport message described above to the UE. Correspondingly, the UE may acquire the TMGI corresponding to the multicast service through the DL NAS Transport message. When the UE successfully acquires the TMGI corresponding to the multicast service, it indicates that the UE has activated the multicast service.

Next, a specific process of activating a multicast service based on a second activation manner in a wireless communication system will be described with reference to FIG. 9.

As shown in FIG. 9, in step 1, the UE may execute steps 1 to 3 in FIG. 8.

Then, in step 2, the UE decides to activate the multicast service according to a second activation manner (i.e., by achieving a compatibility with a multicast service activation manner).

Then, in step 3, the UE may transmit a PDU session establishment request to the network according to the S-NSSI and the DNN obtained in step 1, where the PDU session establishment request may include the S-NSSAI and the DNN corresponding to the multicast service. Then, the AMF entity may select one SMF entity from multiple SMF entities according to the S-NSSAI and the DNN corresponding to the multicast service. Then, the selected SMF entity may select one UPF entity from multiple UPF entities and assign an IP address to the UE.

Then, in step 4, after completing the establishment of the PDU session, the UE transmits an IGMP Join data packet to the network based on the assigned IP address. When IGMP version 1 or 2 is used, a destination IP address of the IGMP Join data packet may be the multicast address of the multicast service. When IGMP version 3 is used, an IGMP protocol part of the IGMP Join data packet may include the multicast address of the multicast service.

Then, in step 5, after detecting an IGMP Join data packet according to a PDR configuration of the SMF entity, the UPF entity may report the multicast address corresponding to the IGMP Join data packet to the SMF entity through an N4 session report message.

Then, in step 6, the SMF entity decides to instruct the UE to activate the multicast service, and transmits a message (Namf_Communication_N1MessageTransfer) to the AMF entity through an Namf interface. The message may include a message for requesting MBS UE Context Activation to instruct the UE to activate the multicast service. The message for requesting MBS UE Context activation may include the S-NSSAI and the DNN corresponding to the multicast service to be activated by the UE. The message for requesting MBS UE Context activation may be encapsulated using an N1 MBS SM Container. In addition, the S-NSSAI and the DNN may be determined through the above step 3, and the multicast address of the multicast service may be determined through the above step 5. Because it is not necessary to establish a user plane corresponding to the multicast service, this message does not include an N2 MBS session container provided by the SMF entity to the RAN.

Then, in step 7, the AMF entity may transmit a downlink NAS transport message related to an N2 interface (N2 downlink NAS Transport) to the RAN through the N2 interface. The downlink NAS transport message related to the N2 interface may include a downlink NAS transport (DL NAS Transport) message, where the DL NAS Transport message may include the above "Request MBS UE Context Activation" encapsulated by the N1 MBS SM Container. Through the downlink NAS transport message related to the N2 interface, the AMF entity may instruct the RAN to directly transmit the DL NAS Transport message to the UE.

Then, in step 8, the RAN may transmit the DL NAS Transport message described above to the UE. Correspondingly, the UE may acquire an S-NSSAI, a DNN, and a multicast address from the SMF entity through the DL NAS Transport message. The UE may determine whether the acquired multicast address is the same as the multicast address that the UE intends to join in step 4, and whether the acquired S-NSSAI and DNN are the same as the S-NSSAI and DNN used during the establishment of the PDU session by the UE in step 3. If the acquired multicast address is the same as the multicast address that the UE intends to join in step 4 and the acquired S-NSSAI and DNN are the same as the S-NSSAI and DNN used during the establishment of the PDU session by the UE in step 3, go to step 9.

Then, in step 9, steps 5 to 14 in FIG. 8 may be executed.

Next, a specific process of establishing a user plane corresponding to a multicast/broadcast service in a wireless communication system will be described with reference to FIG. 10.

As shown in FIG. 10, in step 1, the AF entity may transmit a request (Nnef_MBS SessionStart Request) to the NEF entity through an Nnef interface to request to start a multicast/broadcast service session. The request may include a TMGI corresponding to the multicast/broadcast service, at least one SMF ID, an aggregate maximum rate (e.g., AMBR) corresponding to the multicast/broadcast service, information of at least one data flow corresponding to the multicast/broadcast service, a quality of service requirement of the at least one data flow, an ID of the multicast/broadcast service session, an estimated duration of the multicast/broadcast service session, and a data transmission time of the multicast/broadcast service. The quality of service requirement of each data flow described herein may include a QCI, ARP, priority level, etc. corresponding to the data flow. For a broadcast service, the request may further include a broadcast address of the broadcast service, S-NSSAI and a DNN used by the broadcast service, and a service area of the broadcast service (not shown in the figure). In addition, for the multicast service, the "at least one SMF ID" in the third request described above is all SMF IDs based on which all UEs in the multicast group activate the MBS UE Context. For the multicast service, when different UEs activate the multicast service, the UEs may report SMF IDs to the AF entity respectively, and the AF entity may form an SMF ID list according to the reported SMF IDs. When different UEs report identical SMF IDs, these identical SMF IDs may be regarded as one SMF ID. For the broadcast service, the "at least one SMF ID" in the request is a list of SMF IDs configured in the AF according to the broadcast address of the broadcast service, or a list of SMF IDs determined according to the service area of the broadcast service.

Then, in step 2, the NEF entity may determine a PCF entity corresponding to the SMF ID based on the SMF ID according to a network configuration, and may transmit a request (Npcf_MBS SessionStart Request) to the PCF entity through an Npcf interface to request to start a multicast/Broadcast business session. The request may include a TMGI corresponding to the multicast/broadcast service, an SMF ID, an aggregate maximum rate (e.g., AMBR) corresponding to the multicast/broadcast service, information of at least one data flow corresponding to the multicast/broadcast service, a quality of service requirement of the at least one data flow, an ID of the multicast/broadcast service session, an estimated duration of the multicast/broadcast service session, and a data transmission time of the multicast/broadcast service. In addition, for a broadcast service, the request may further include a broadcast address of the broadcast service, S-NSSAI and a DNN used by the broadcast service, and a service area of the broadcast service (not shown in the figure). The request may include a list of SMF IDs. In this case, the PCF entity needs to execute the following step 3 for the SMFs in the list respectively.

Then, in step 3, the PCF entity may transmit a request (Nsmf_MBS SessionStart Request) to the SMF entity through an Nsmf interface to request to start the multicast/broadcast service session. The request may include the TMGI corresponding to the multicast/broadcast service, the aggregate maximum rate (e.g., AMBR) corresponding to the multicast/broadcast service, a quality of service rule of at least one data flow corresponding to the multicast/broadcast service, the ID of the multicast/broadcast service session, the estimated duration of the multicast/broadcast service session, and the data transmission time of the multicast/broadcast service. For a broadcast service, the request may further include a broadcast address of the broadcast service, S-NSSAI and a DNN used by the broadcast service, and a service area of the broadcast service (not shown in the figure). Then, the SMF entity may generate an MBS QFI, QoS profile and N4 QER rule corresponding to each data flow according to the received quality of service rule of the at least one data flow corresponding to the multicast/broadcast service.

Then, in step 4, for a multicast service, the SMF entity may determine a corresponding MBS UE Context according to the TMGI, and according to the determined MBS UE Context, acquire S-NSSAI, a DNN, and a multicast address contained in the MBS UE Context. For a broadcast service, the request message of the PCF includes a broadcast address of the broadcast service, S-NSSAI and a DNN used by the broadcast service, and a service area of the broadcast service (not shown in the figure). Then, the SMF entity may select one UPF entity from multiple UPF entities according to the acquired S-NSSAI, DNN, and multicast/broadcast address. Then, the SMF entity may transmit a request for requesting to establish an MBS session (N4 MBS Session Establishment Request) to the selected UPF entity through an N4 interface. The request may include a multicast/broadcast address of the multicast/broadcast service, a quality of service enforcement rule of the at least one data flow corresponding to the multicast/broadcast service, and an aggregate maximum rate (e.g., AMBR) corresponding to the multicast/broadcast service. Then, the UPF entity may establish a GTP user plane tunnel transmission tree from the UPF entity to the RAN based on a multicast routing protocol according to the received request, so as to transmit data to be transmitted by the UPF entity to the RAN (e.g., service data corresponding to the multicast/broadcast service) in the form of a tree-like GTP user plane tunnel. Then, the UPF entity may assign a tunnel multicast address for transmitting the service data corresponding to the multicast/broadcast service. Specifically, the UPF entity may assign the multicast/broadcast service a multicast address passing through a GTP user plane tunnel of an N3 interface, and use the assigned multicast address of the GTP user plane tunnel as the tunnel multicast address (e.g., CN N3 tunnel multicast address). Then, the UPF entity may assign a fifth identifier (e.g., CN N3 C-TEID) to the multicast/broadcast service. For the multicast service, the SMF entity may record the tunnel multicast address and the fifth identifier in each user equipment multicast service context of the multicast service that is already activated. For the broadcast service, the SMF entity may record the tunnel multicast address and the fifth identifier in a broadcast service session context corresponding to the broadcast service. For the broadcast service, there is not a broadcast service session context for each UE (that is, per UE), but there is one entity-level broadcast service session context on the SMF entity. For different broadcast services, different broadcast service session contexts may exist.

Then, the SMF entity may determine, according to a network configuration, whether to execute step 5a immediately after step 4 or to execute step 5b after step 12 which will be described later. In step 5a/5b, the SMF entity may transmit a response message (Nsmf_MBS SessionStart Response) to the PCF entity through the Nsmf interface as an acknowledgment of the "Nsmf_MBS SessionStart Request" transmitted by the PCF entity to the SMF entity described in step 3.

Then, in step 6a/6b, the PCF entity may transmit a response message (Npcf MB S SessionStart Response) to the NEF entity through the Npcf interface as an acknowledgment of the "Npcf_MBS SessionStart Request" transmitted by the NEF entity to the PCF entity described in step 2.

Then, in step 7, for the multicast service, the SMF entity may determine all RAN IDs according to each MBS UE Context of the multicast/broadcast service that is already activated. Then, the SMF entity may acquire a corresponding AMF ID from the MBS UE Context corresponding to each RAN ID, and transmit an N2 interface-related MBS message transfer communicated through the Namf interface (Namf_Communication_N2MBSMessageTransfer) to the AMF entity through the Namf interface. The message transfer includes the RAN ID, TMGI, aggregate maximum rate (e.g., AMBR) corresponding to the multicast/broadcast service, MBS QFI and QoS profile corresponding to each data flow of the multicast/broadcast service, CN N3 C-TEID, and CN N3 tunnel multicast address. In addition, the TMGI, MBS QFI and QoS profile corresponding to each data flow, CN N3 C-TEID, and CN N3 tunnel multicast address described herein may be encapsulated using an N2 MBS SM Container. For the broadcast service, the SMF entity may determine an identifier of at least one serving base station (e.g., RAN ID) according to the service area of the broadcast service, and the SMF may determine the AMF ID corresponding to each RAN ID according to network configuration information.

Then, in step 8, the AMF entity may transmit a request for requesting to start an MBS session (N2 MBS Session Start Request) to the RAN through an N2 interface, and may include the S-NSSAI and TMGI corresponding to the multicast/broadcast service, the aggregate maximum rate (e.g., AMBR) corresponding to the multicast/broadcast service, the MBS QFI and the QoS profile corresponding to each data flow of the multicast/broadcast service, the CN N3 C-TED corresponding to the multicast/broadcast service, and the CN N3 tunnel multicast address corresponding to the multicast/broadcast service. The MBS QFI and QoS profile corresponding to each data flow of the multicast/broadcast service described herein are determined through the above step 2, and the CN N3 C-TEID corresponding to the multicast/broadcast service and the CN N3 tunnel multicast address corresponding to the multicast/broadcast service described herein are determined through the above step 4.

Then, in step 9, the RAN may transmit a response message (N2 MBS Session Start Response) to the AMF entity through the N2 interface, as an acknowledgement of the N2 MB S Session Start Request transmitted by the AMF entity to the RAN in the above step 8.

Then, in step 10, the RAN may allocate resources for transmitting MBS service data to UEs served by the serving base station, to support data flows with different quality of service requirements. Accordingly, the UEs may receive the MBS service data through the allocated resources.

Then, in step 11, the RAN may join a transport group corresponding to the CN N3 tunnel multicast address, and receive the MBS service data from the UPF entity.

Then, in step 12, the AMF entity may transmit a notification message (Namf_Communication_N2MBSMessageNotify) to the SMF entity through the Namf interface as a response to the Namf_Communication_N2MBSMessageTransfer transmitted by the SMF entity to the AMF entity in the above step 7.

Then, in step 13, when the NEF entity receives the response messages of all the PCF entities, or after a preset time after the NEF entity receives the response messages of all the PCF entities, the NEF entity may transmit a response message (Nnef_MBS SessionStart Response) to the AF entity through the Nnef interface. The response message may include a first list and a second list. The first list may be a list of SMF IDs of SMF entities that have successfully established a user plane corresponding to the multicast/broadcast service. The second list may be a list of SMF IDs of SMF entities that have not successfully established a user plane corresponding to the multicast/broadcast service. When the AF entity receives the response message from the NEF entity, or after a preset time after the AF entity receives the response message from the NEF entity, the above step 1 to step 13 may be executed again for the SMF entities corresponding to the SMF IDs in the second list.

Then, in step 14, the multicast/broadcast service may be started. The AF entity may transmit an MBS data packet whose destination IP address is the multicast/broadcast address of the multicast/broadcast service to the downstream UPF entities. Then, the UPF entities may transmit the MBS data packet to the RANs by the transport layer multicast method described above. Then, the RANs may transmit the MBS data packet to the UEs through the resources allocated to the UEs.

Figure 11:
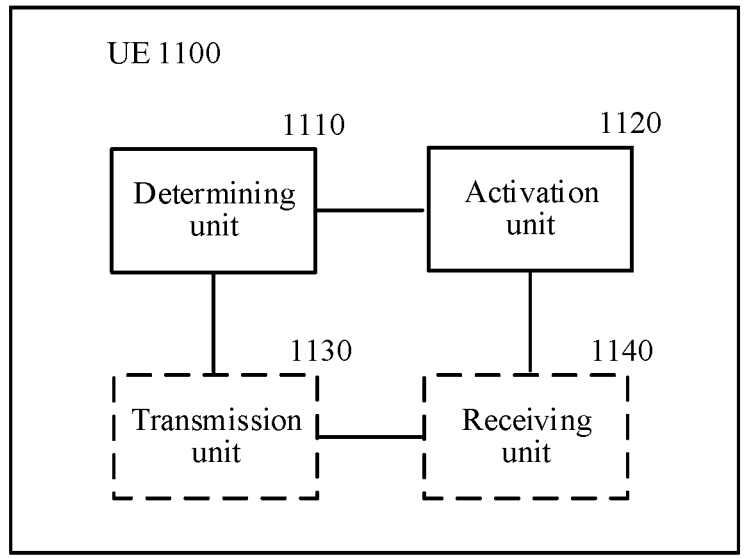
FIG. 11 is a schematic structural diagram of a user equipment according to an embodiment of the present disclosure.

A UE corresponding to the method shown in FIG. 3 according to the embodiments of the present disclosure will be described below with reference to FIG. 11. FIG. 11 is a schematic structural diagram of a UE 1100 according to an embodiment of the present disclosure. Because the functions of the UE 1100 are the same as the details of the method described above with reference to FIG. 3, the detailed description of the same contents is omitted here for brevity. As shown in FIG. 11, the UE 1100 includes: a determining unit 1110 configured to determine an activation manner for activating a multicast service; and an activation unit 1120 configured to activate the multicast service according to the determined activation manner through a session management function entity. In addition to the two units, the UE 1100 may also include other components. Since these components are irrelevant to the content of the embodiments of the present disclosure, the corresponding illustration and description will be omitted here. One or more units of the UE 1100 can be implemented by processing circuitry, software, or a combination thereof, for example.

As shown in FIG. 11, the activation manner determined by the determining unit 1110 may be a first activation manner or a second activation manner.

According to an example of the present disclosure, in the first activation manner, the UE does not need to establish a Protocol Data Unit (PDU) session and acquire an IP address (e.g., an IP address assigned by an SMF entity) before activating the multicast service). That is to say, in the first activation manner, the UE does not need to perform a step similar to step 1 shown in FIG. 1. Therefore, the first activation manner optimizes the multicast service activation process.

In addition, according to an example of the present disclosure, in the second activation manner, the UE needs to establish a PDU session and acquire an IP address (e.g., an IP address assigned by an SMF entity) before activating the multicast service. That is to say, in the second activation manner, the UE needs to perform a step similar to step 1 shown in FIG. 1. Therefore, the second activation manner is compatible with the multicast service activation process.

In the present disclosure, the determining unit 1110 may determine the activation manner for activating the multicast service according to an attribute of the UE 1100. The attribute described herein may refer to a supporting capability of the UE for various applications. For example, when the UE only supports mobile applications or the UE does not need an IP data transmission function, the determining unit 1110 may determine that the activation manner for activating the multicast service is the first activation manner. For example, when the UE needs to support an IP-based application, the determining unit 1110 may determine that the activation manner for activating the multicast service is the second activation manner.

The determining unit 1110 may also determine the activation manner for activating the multicast service in other manners, which is not limited in the present disclosure.

In addition, according to an example of the present disclosure, the determining unit 1110 may further determine a first identifier and a second identifier corresponding to the multicast service, where the first identifier and the second identifier are used for an access and mobility management function entity to select the session management function entity. Specifically, the first identifier may be used for identifying a network slice corresponding to the multicast service. For example, the first identifier may be Single Network Slice Selection Assistance Information (S-NSSAI). In addition, the second identifier may be used for identifying a data network corresponding to the multicast service. For example, the second identifier may be a Data Network Name (DNN).

Specifically, the determining unit 1110 may acquire a user equipment route selection policy rule (UE Route Selection Policy Rule, URSP) corresponding to each multicast service in at least one multicast service from a policy control function (PCF) entity, where each user equipment route selection policy rule includes at least a multicast address of the corresponding multicast service. For example, first, the UE may initiate a registration procedure with the network; then, in a process of establishing a UE policy association between an AMF entity and the PCF entity, the PCF entity may provide the UE with a URSP rule corresponding to each multicast service in at least one multicast service through the AMF entity, and correspondingly, the UE may acquire the URSP rule corresponding to each multicast service in the at least one multicast service from the PCF entity through the AMF entity.

Then, the determining unit 1110 may determine a user equipment route selection policy rule corresponding to the multicast service according to a multicast address of the multicast service. For example, when the UE intends to activate a multicast service, the UE may determine a URSP rule corresponding to the multicast service according to a multicast address of the multicast service.

Then, the determining unit 1110 may determine the first identifier and the second identifier corresponding to the multicast service according to the determined user equipment route selection policy rule. For example, the UE may obtain a route selection descriptor according to the URSP rule corresponding to the multicast service, where the route selection descriptor includes a first identifier and a second identifier; then, the UE uses the first identifier and the second identifier included in the route selection descriptor as the first identifier and the second identifier corresponding to the multicast service.

In addition, after the determining unit 1110 determines the activation manner for activating the multicast service, the activation unit 1120 activates the multicast service according to the determined activation manner through a session management function entity.

According to an example of the present disclosure, when the activation manner determined by the determining unit 1110 is the first activation manner, the activation unit 1120 activates the multicast service according to the first activation manner through the session management function entity. In this case, the UE 1100 may further include a transmission unit 1130 and a receiving unit 1140.

Specifically, the activation unit 1120 may determine a third identifier, where the third identifier is used for identifying a user equipment multicast service context established for activating the multicast service. For example, the UE may assign an identifier (ID) to the user equipment multicast service context. The "user equipment multicast service context established for activating the multicast service" described herein may also be referred to as a user equipment multicast service context for the multicast service (MBS UE Context). Correspondingly, the third identifier may also be referred to as an identifier of the user equipment multicast service context for the multicast service (MBS UE Context ID).

Then, the transmission unit 1130 transmits a request for activating the user equipment multicast service context to the session management function entity, where the request for activating the user equipment multicast service context includes the third identifier and a multicast address of the multicast service. For example, the UE may transmit the request for activating the user equipment multicast service context to the session management function through the access and mobility management function entity.

Specifically, first, the transmission unit 1130 may transmit an uplink Non-Access Stratum (NAS) transport (UL NAS Transport) message to the AMF entity, where the UL NAS Transport message includes at least three information elements, among which a first information element is the first identifier corresponding to the multicast service, a second information element is the second identifier corresponding to the multicast service, and a third information element is a request for activating the MBS UE Context. The request for activating the MBS UE Context may be represented as Active MBS UE Context Request, and may include the third identifier corresponding to the multicast service and the multicast address of the multicast service. In an example where the first identity is S-NSSAI, the second identity is DNN, and the third identifier is MBS UE Context ID, the UL NAS Transport message transmitted by the UE to the AMF entity may include three information elements, among which a first information element is the S-NSSAI corresponding to the multicast service, a second information element is the DNN corresponding to the multicast service, and a third information element is a request for activating the MBS UE Context. The request for activating the MBS UE Context includes the MBS UE Context ID corresponding to the multicast service and the multicast address of the multicast service.

In the present disclosure, the UE may encapsulate the "request for activating the MBS UE Context" described herein using a specific format. For example, the specific format may be an N1 interface-related session management container for the multicast service (N1 MBS SM Container).

Then, the AMF entity may select the corresponding SMF entity according to the first identifier and the second identifier corresponding to the multicast service. In an example where the first identifier is S-NSSAI and the second identifier is DNN, the AMF entity may select the corresponding SMF entity according to the S-NSSAI and the DNN corresponding to the multicast service.

Then, the AMF entity may transmit a request to the corresponding SMF entity through an Nsmf interface, where the request may be used for requesting to create an MBS UE Context related to an MBS session. This request may be represented as Nsmf_MBSSession_CreateMBSUEContext Request. The request may include the first identifier and the second identifier corresponding to the multicast service, and the "request for activating the MBS UE Context" described above. In an example where the first identifier is S-NSSAI, the second identifier is DNN, and the third identifier is MBS UE Context ID, the AMF entity may transmit a request to the SMF entity through the Nsmf interface, where the request may include the S-NSSAI corresponding to the multicast service, the DNN corresponding to the multicast service, and the "request for activating the MBS UE Context" described above.

In addition, according to an example of the present disclosure, the request transmitted by the AMF entity to the SMF entity may further include a dedicated identifier of the UE. For example, the dedicated identifier of the UE may be a Subscription Permanent Identifier (SUPI). In addition, according to another example of the present disclosure, the request transmitted by the AMF entity to the SMF entity may further include an identifier of a serving base station of the UE. For example, the identifier of the serving base station of the UE may be a corresponding RAN ID, and the RAN ID may be reported to the AMF entity by a RAN accessed by the UE. In addition, according to another example of the present disclosure, the request transmitted by the AMF entity to the SMF entity may further include both the dedicated identifier of the UE and the identifier of the serving base station of the UE, e.g., the SUPI of the UE and the corresponding RAN ID.

The SMF entity may record the received RAN ID in the MBS UE Context of the UE. In addition, the SMF entity determines a fourth identifier corresponding to the multicast service according to the received information, where the fourth identifier is used for the user equipment to determine whether the multicast service is activated, and the fourth identifier is an identifier assigned by an application function (AF) entity to the multicast service; and feeds back the fourth identifier to the AMF entity. These operations will be described in detail below with reference to the embodiments of the SMF entity described in conjunction with FIGS. 12-13.

The fourth identifier described herein may be a Temporary Mobile Group Identity (TMGI) assigned by the AF entity to the multicast service activated based on the multicast address.

Then, the receiving unit 1140 receives a response to the request for activating the user equipment multicast service context from the session management function entity, where the response includes a fourth identifier corresponding to the multicast service, and the fourth identifier is used for the user equipment to determine whether the multicast service is activated. Specifically, the receiving unit 1140 may receive a response to the request for activating the user equipment multicast service context from the session management function entity through a serving base station of the user equipment and the access and mobility management function entity.

Specifically, first, the SMF entity may transmit a response message to the AMF entity through an Nsmf interface, in response to the Nsmf_MBSSession_CreateMBSUEContext Request transmitted by the AMF entity to the SMF entity described above with reference to step S3022'. The response message may be an acknowledgement of the Nsmf MBSSession CreateMBSUEContext Request transmitted by the AMF entity to the SMF entity described above with reference to step S3022'. The response message may be represented as Nsmf_MBSSession_CreateMBSUEContext Response.

Then, the SMF entity may transmit another request message to the AMF entity through an Namf interface, in response to the request for activating the MBS UE Context transmitted by the AMF entity to the SMF entity described above with reference to step S3022'. The another request message may include the "response to the request for activating the user equipment multicast service context" described above, and the "response to the request for activating the user equipment multicast service context" described above may include the fourth identifier corresponding to the multicast service. For example, the another request message may be transmitted through a message related to the N1 interface and communicated through the Namf interface, may be represented as Namf_Communication_N1MessageTransfer, and may include the response to the request for activating the user equipment multicast service context, e.g., an Activate MBS UE Context Response. The Activate MBS UE Context Response includes the fourth identifier corresponding to the multicast service. In an example where the fourth identifier is a TMGI, the Activate MBS UE Context Response includes a TMGI corresponding to the multicast service.

In the present disclosure, the SMF entity may encapsulate the "Activate MBS UE Context Response" described herein using a specific format. For example, the specific format may be an N1 interface-related session management container for the multicast service (N1 MBS SM Container).

Then, the AMF entity may transmit a downlink NAS transport message related to an N2 interface to the RAN through the N2 interface. The downlink NAS transport message related to the N2 interface may be represented as N2 downlink NAS Transport. The downlink NAS transport message related to the N2 interface may include a downlink NAS transport (DL NAS Transport) message, where the DL NAS Transport message includes an information element, that is, the "Activate MBS UE Context Response" described above. Through the downlink NAS transport message related to the N2 interface, the AMF entity may instruct the RAN to directly transmit the DL NAS Transport message to the UE. It is to be understood that the "Activate MBS UE Context Response" included in the DL NAS Transport message described herein may also be encapsulated by the N1 MBS SM Container described above.

Then, the RAN may transmit the DL NAS Transport message described above to the UE. Correspondingly, the receiving unit 1140 may acquire the fourth identifier corresponding to the multicast service through the DL NAS Transport message. In an example where the fourth identifier is a TMGI, the UE may acquire the TMGI corresponding to the multicast service through the DL NAS Transport message.

In the present disclosure, when the UE successfully acquires the fourth identifier corresponding to the multicast service, it indicates that the UE has activated the multicast service.

So far, an exemplary process where the activation unit 1120 activates the multicast service according to the first activation manner through the session management function entity has been described. Next, an exemplary process where the activation unit 1120 activates the multicast service according to the second activation manner through the session management function entity will be described.

According to an example of the present disclosure, when the activation manner determined by the determining unit 1110 is the second activation manner, the activation unit 1120 activates the multicast service according to the second activation manner through the session management function entity. In this case, the UE 1100 may further include the transmission unit 1130 and the receiving unit 1140 described above.

Specifically, the transmission unit 1130 may acquire an Internet Protocol address (IP address) from the session management function entity according to the first identifier and the second identifier corresponding to the multicast service. In an example where the first identifier is S-NSSAI and the second identifier is DNN, the UE may transmit a PDU session establishment request to the network according to the S-NSSAI and the DNN corresponding to the multicast service, where the PDU session establishment request may include the S-NSSAI and the DNN corresponding to the multicast service. Then, the AMF entity may select one SMF entity from multiple SMF entities according to the S-NSSAI and the DNN corresponding to the multicast service. Then, the selected SMF entity may select one UPF entity from multiple UPF entities and assign an IP address to the UE.

Then, the transmission unit 1130 may transmit a data packet to the network according to the acquired Internet Protocol address, so that a user plane function (UPF) entity in the network acquires the data packet. A destination address of the data packet is the multicast address of the multicast service, or a protocol part of the data packet includes the multicast address of the multicast service. For example, after step S3021", the UE may transmit an IGMP Join data packet to the network based on the assigned IP address after completing the establishment of the PDU session. When IGMP version 1 or 2 is used, a destination IP address of the IGMP Join data packet may be the multicast address of the multicast service. When IGMP version 3 is used, an IGMP protocol part of the IGMP Join data packet may include the multicast address of the multicast service.

Then, the receiving unit 1140 may acquire a first identifier, a second identifier, and a multicast address from the session management function entity.

Specifically, the SMF entity may acquire a multicast address of a multicast service to be activated by the user equipment from the user plane function entity. For example, after detecting an IGMP Join data packet according to a packet detection rule (PDR) configuration of the SMF entity, the above UPF entity may report a multicast address corresponding to the IGMP Join data packet to the SMF entity (e.g., report the multicast address corresponding to the IGMP Join packet through an N4 session report message).

Then, the SMF entity may decide to instruct the user equipment to activate the multicast service. The SMF entity may transmit a request for instructing the user equipment to activate the multicast service to the user equipment in a case that the SMF entity decides to instruct the user equipment to activate the multicast service, where the request for instructing the user equipment to activate the multicast service includes a first identifier and a second identifier corresponding to the multicast service to be activated by the user equipment, and the multicast address of the multicast service. For example, the SMF entity may transmit the request for instructing the user equipment to activate the multicast service to the user equipment through the access and mobility management function entity.

Then, the AMF entity may transmit a downlink NAS transport message related to an N2 interface to the RAN through the N2 interface. The downlink NAS transport message related to the N2 interface may be represented as N2 downlink NAS Transport. The downlink NAS transport message related to the N2 interface may include a downlink NAS transport (DL NAS Transport) message, where the DL NAS Transport message may include the above "Request MBS UE Context Activation" encapsulated by the N1 MBS SM Container. Through the downlink NAS transport message related to the N2 interface, the AMF entity may instruct the RAN to directly transmit the DL NAS Transport message to the UE.

Then, the RAN may transmit the DL NAS Transport message described above to the UE. Correspondingly, the receiving unit 1140 may acquire a first identity, a second identity, and a multicast address from the SMF entity through the DL NAS Transport message.

The activation unit 1120 may determine whether the acquired first identifier is the same as the determined first identifier, whether the acquired second identifier is the same as the determined second identifier, and whether the acquired multicast address is the same as the multicast address of the multicast service. For example, according to the DL NAS Transport message received from the RAN, the UE may determine whether the multicast address in the "Request MBS UE Context Activation" encapsulated by the N1 MBS SM Container is the same as the multicast service of the multicast service that the UE intends to activate, and determine whether the S-NSSAI and the DNN in the "Request MBS UE Context Activation" encapsulated by the N1 MBS SM Container are the same as the S-NSSAI and the DNN used during the establishment of the PDU session.

When the activation unit 1120 determines that the acquired first identifier is different from the determined first identifier and/or the acquired second identifier is different from the determined second identifier and/or the acquired multicast address is different from the multicast address of the multicast service, the activation unit 1120 cannot activate the multicast service. On the contrary, when the activation unit 1120 determines that the acquired first identifier is the same as the determined first identifier, the acquired second identifier is the same as the determined second identifier, and the acquired multicast address is the same as the multicast addresses of the multicast service, the activation unit 1120 can activate the multicast service.

Specifically, the activation unit 1120 may determine a third identifier, where the third identifier is used for identifying a user equipment multicast service context established for activating the multicast service. Then, the transmission unit 1130 may transmit a request for activating the user equipment multicast service context to the session management function entity, where the request for activating the user equipment multicast service context includes the third identifier and a multicast address of the multicast service. Then, the receiving unit 1140 may receive a response to the request for activating the user equipment multicast service context from the session management function entity, where the response includes a fourth identifier corresponding to the multicast service, and the fourth identifier is used for the user equipment to determine whether the multicast service is activated.

According to the user equipment of the embodiments of the present disclosure, the user equipment may determine an activation manner for activating a multicast service and activate the multicast service according to the determined activation manner through a session management function entity in a network, thereby optimizing the multicast service activation process or achieving a compatibility with the multicast service activation process.

Figure 12:
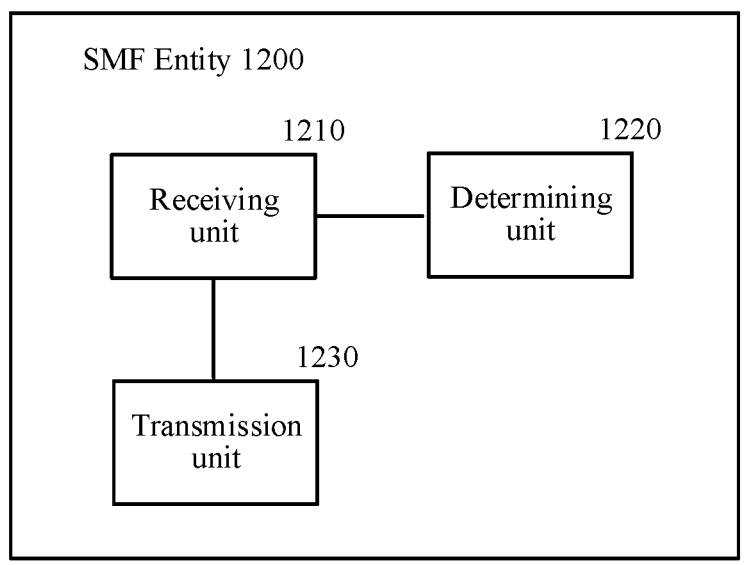
FIG. 12 is a schematic structural diagram of a session management function entity according to an embodiment of the present disclosure.

An SMF entity corresponding to the method shown in FIG. 5 according to the embodiments of the present disclosure will be described below with reference to FIG. 12. FIG. 12 is a schematic structural diagram of an SMF entity 1200 according to an embodiment of the present disclosure. Because the functions of the SMF entity 1200 are the same as the details of the method described above with reference to FIG. 5, the detailed description of the same contents is omitted here for brevity. As shown in FIG. 12, the SMF entity 1200 includes: a receiving unit 1210 configured to receive a request for activating a user equipment multicast service context from a user equipment, the user equipment multicast service context being established by the user equipment for activating a multicast service, the request for activating the user equipment multicast service context including a third identifier and a multicast address of the multicast service, and the third identifier being used for identifying the user equipment multicast service context; a determining unit 1220, configured to determine a response to the request for activating the user equipment multicast service context, the response including a fourth identifier corresponding to the multicast service, and the fourth identifier being used for the user equipment to determine whether the multicast service is activated; and a transmission unit 1230, configured to transmit the response to the user equipment. In addition to the three units, the SMF entity 1200 may also include other components. Since these components are irrelevant to the content of the embodiments of the present disclosure, the corresponding illustration and description will be omitted here.

According to an example of the present disclosure, the request transmitted by the AMF entity to the SMF entity may further include a dedicated identifier of the UE. For example, the dedicated identifier of the UE may be a Subscription Permanent Identifier (SUPI). In addition, according to another example of the present disclosure, the request transmitted by the AMF entity to the SMF entity may further include an identifier of a serving base station of the UE. For example, the identifier of the serving base station of the UE may be a corresponding RAN ID, and the RAN ID may be reported to the AMF entity by a RAN accessed by the UE. In addition, according to another example of the present disclosure, the request transmitted by the AMF entity to the SMF entity may further include both the dedicated identifier of the UE and the identifier of the serving base station of the UE, e.g., the SUPI of the UE and the corresponding RAN ID.

In addition, according to an example of the present disclosure, the receiving unit 1210 may record the identifier of the serving base station of the user equipment in the user equipment multicast service context, so that the SMF entity acquires identifiers of serving base stations of all user equipments that activate the multicast service through the SMF entity, for use in establishing a user plane of the MBS session. For example, the receiving unit 1210 may record the received RAN ID in the MBS UE Context of the UE.

In addition, the determining unit 1220 determines a response to the request for activating the user equipment multicast service context, where the response includes a fourth identifier corresponding to the multicast service, and the fourth identifier is used for the user equipment to determine whether the multicast service is activated. For example, the determining unit 1220 determines the fourth identifier corresponding to the multicast service at least according to the first identifier, the second identifier, the third identifier, and the multicast address of the multicast service, where the fourth identifier is an identifier assigned by an application function entity to the multicast service.

Specifically, the determining unit 1220 may determine whether the user equipment is capable of using the multicast service. For example, the determining unit 1220 may obtain subscription data of the UE from a unified data management (UDM) entity and determine whether the UE has subscribed to the multicast service. If the UE has subscribed to the multicast service, the determining unit 1220 may determine that the UE is capable of using the multicast service. If the UE has not subscribed to the multicast service, the determining unit 1220 may determine that the UE is not capable of using the multicast service.

The transmission unit 1230 transmits a notification to an application function entity in a case that the determining unit 1220 determines that the UE is capable of using the multicast service, where the notification is an authorization request notification for the multicast service. The notification includes at least the first identifier, the second identifier, the multicast address of the multicast service, and an identifier of the session management function entity. The "identifier of the session management function entity" is used for the application function entity to acquire the session management function entity involved in activation of the multicast service by all user equipments that intend to activate the multicast service, for use during subsequently establishing a user plane corresponding to the multicast service.

Specifically, the transmission unit 1230 may directly transmit the notification to the application function entity. For example, the SMF entity may determine a corresponding AF entity according to the first identifier, the second identifier, and the multicast address of the multicast service. Then, the transmission unit 1230 may transmit the notification to the AF entity through a network exposure function entity. The notification may include the first identifier, the second identifier, a dedicated identifier and a public identifier of the user equipment, the multicast address of the multicast service, and the identifier of the session management function entity (e.g., an SMF ID and IP address of the SMF entity).

The transmission unit 1230 may transmit the notification to the application function entity through a network exposure function entity.

In an example where the transmission unit 1230 transmits the notification to the application function entity through the network exposure function entity, the transmission unit 1230 may transmit a notification to the network exposure function entity, where the notification may include the first identifier, the second identifier, the dedicated identifier and the public identifier (e.g., Generic Public Subscription Identifier (GPSI)) of the user equipment, the multicast address of the multicast service, the identifier of the session management function entity, and an identifier of the application function entity (e.g., an AF ID of the AF entity determined by the SMF entity), so that the network exposure function entity transmits another notification to the application function entity according to the identifier of the application function entity. The another notification may include the first identifier, the second identifier, the dedicated identifier and the public identifier of the user equipment, the multicast address of the multicast service, and the identifier of the session management function entity.

In an example where the first identifier is S-NSSAI, the second identifier is DNN, the dedicated identifier of the UE is SUPI, the public identifier of the UE is GPSI, the identifier of the session management function entity is SMF ID, and the identifier of the application function entity is AF ID, the transmission unit 1230 may transmit an authorization request notification for the MBS to an NEF entity through an Nsmf interface, where the notification may be represented as Nsmf_MBS AuthorizationRequest Notify, and the notification may include the S-NSSAI and the DNN corresponding to the multicast service, the dedicated identifier SUPI of the UE, the public identifier GPSI of the UE, the multicast address of the multicast service, the SMF ID, and the AF ID. In addition, the notification may also include other information, e.g., information related to a location of the UE, such as a Cell Global Identifier (CGI), Tracking Area Identity (TAI), Globally Unique AMF Identifier (GUAMI) etc.

Then, after receiving the notification, the network exposure function entity may transmit another notification to the application function entity according to the identifier of the application function entity. The another notification may include the first identifier, the second identifier, the dedicated identifier and the public identifier of the user equipment, the multicast address of the multicast service, and the identifier of the session management function entity.

In an example where the first identifier is S-NSSAI, the second identifier is DNN, the dedicated identifier of the UE is SUPI, the public identifier of the UE is GPSI, the identifier of the session management function entity is SMF ID, and the identifier of the application function entity is AF ID, the NEF entity may transmit an authorization request notification for the MBS to the corresponding AF entity through an Nnef interface and according to the AF ID, where the notification may be represented as Nnef_MBS AuthorizationRequest Notify, and the notification may include the S-NSSAI and the DNN corresponding to the multicast service, the dedicated identifier SUPI of the UE, the public identifier GPSI of the UE, the multicast address of the multicast service, and the SMF ID. In addition, the notification may also include other information, e.g., information related to the location of the UE, such as one or more of a CGI, TAI, GUAMI, or the like.

The AF entity may record the received SMF ID for use in establishing the user plane of the MBS session. In addition, the AF entity may further determine a fourth identifier corresponding to the multicast service. The fourth identifier described herein may be a Temporary Mobile Group Identity (TMGI) assigned by the AF entity to the multicast service activated based on the multicast address.

When the AF entity receives the message from the NEF entity, the fourth identifier may be the TMGI. Correspondingly, the AF entity may feed back a response message to the authorization request notification for the MBS to the NEF entity through an Nnef interface, where the response message may be represented as Nnef_MBS AuthorizationRequest Notify Response, and the response message may include the TMGI corresponding to the multicast service. Then, the NEF entity may feed back a response message to the authorization request notification for the MBS to the SMF entity through an Nsmf interface, where the response message may be represented as Nsmf_MBS AuthorizationRequest Notify Response, and the response message may include the TMGI corresponding to the multicast service.

Correspondingly, the receiving unit 1210 may receive, from the application function entity, a response to the notification transmitted by the transmission unit 1230, where the response to the notification includes the fourth identifier corresponding to the multicast service, so as to acquire the fourth identifier corresponding to the multicast service from the application function entity. In an example where the fourth identifier is a TMGI, the SMF entity may acquire the TMGI corresponding to the multicast service from the AF entity.

Then, the transmission unit 1230 may create an MBS UE Context based on the above multicast address for the UE, and then may feed back a response message to the AMF entity, where the response message may be used as a response to the Nsmf_MBSSession_CreateMBSUEContext Request described above. The response message may be an acknowledgement of the Nsmf_MBSSession_CreateMBSUEContext Request described above, and may be represented as Nsmf_MBSSession_CreateMBSUEContext Response.

Then, the transmission unit 1230 may transmit a response to the request for activating the user equipment multicast service context to the user equipment, where the response includes the fourth identifier corresponding to the multicast service. For example, the transmission unit 1230 may transmit another request message to the AMF entity through an Namf interface, in response to the request for activating the MBS UE Context transmitted by the AMF entity to the SMF entity described above with reference to step S3022'. The another request message may include the fourth identifier corresponding to the multicast service. For example, the another request message may be transmitted through a message related to the N1 interface and communicated through the Namf interface, may be represented as Namf_Communication_N1MessageTransfer, and includes an Activate MBS UE Context Response, where the Activate MBS UE Context Response includes the fourth identifier corresponding to the multicast service. In an example where the fourth identifier is a TMGI, the Activate MBS UE Context Response includes a TMGI corresponding to the multicast service.

In the present disclosure, the SMF entity may encapsulate the "Activate MBS UE Context Response" described herein using a specific format. For example, the specific format may be an N1 interface-related session management container for the multicast service (N1 MBS SM Container).

So far, a schematic structural diagram of an SMF entity according to the embodiments of the present disclosure has been described with reference to FIG. 12.

Figure 13:
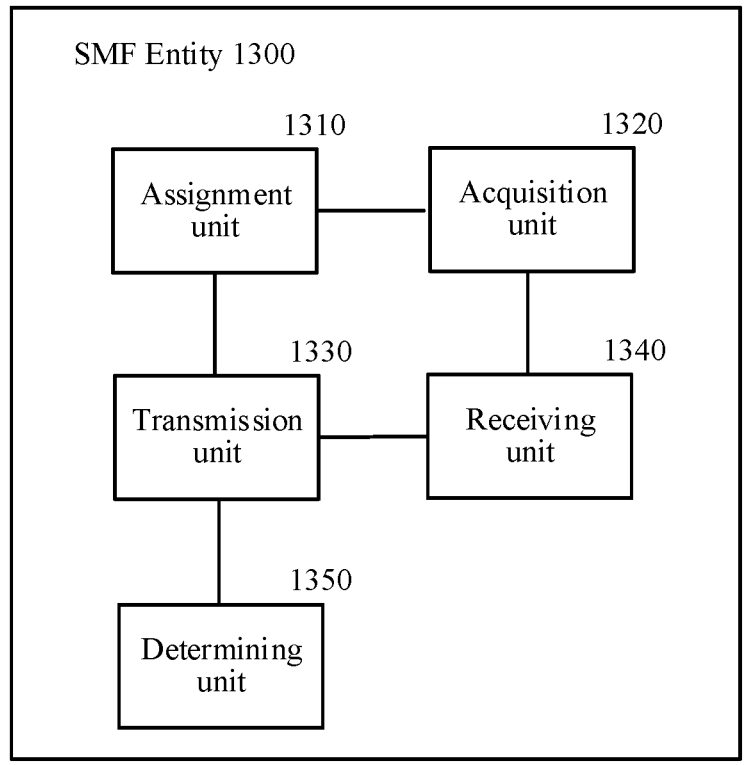
FIG. 13 is another schematic structural diagram of a session management function entity according to an embodiment of the present disclosure.

An SMF entity corresponding to the method shown in FIG. 6 according to the embodiments of the present disclosure will be described below with reference to FIG. 13. FIG. 13 is another schematic structural diagram of an SMF entity 1300 according to an embodiment of the present disclosure. Because the functions of the SMF entity 1300 are the same as the details of the method described above with reference to FIG. 6, the detailed description of the same contents is omitted here for brevity. As shown in FIG. 13, the SMF entity 1300 includes: an assignment unit 1310, configured to establish a protocol data unit session, and assign an Internet Protocol address to the user equipment; an acquisition unit 1320, configured to acquire a multicast address of a multicast service to be activated by the user equipment from a user plane function entity participating in the establishment of the protocol data unit session, where the multicast address is acquired after the user equipment transmits a data packet to a network including the user plane function entity according to the Internet Protocol address, the data packet is used for indicating the multicast service that the user equipment intends to activate, and a destination address of the data packet is the multicast address of the multicast service, or a protocol part of the data packet includes the multicast address of the multicast service; a transmission unit 1330, configured to transmit a request for instructing the user equipment to activate the multicast service to the user equipment in a case that the session management function entity decides to instruct the user equipment to activate the multicast service, where the request for instructing the user equipment to activate the multicast service includes a first identifier and a second identifier corresponding to the multicast service to be activated by the user equipment, and the multicast address of the multicast service; a receiving unit 1340, configured to receive a request for activating a user equipment multicast service context from a user equipment, the user equipment multicast service context being established by the user equipment for activating a multicast service, the request for activating the user equipment multicast service context including a third identifier and a multicast address of the multicast service, and the third identifier being used for identifying the user equipment multicast service context; and a determining unit 1350, configured to determine a response to the request for activating the user equipment multicast service context, the response including a fourth identifier corresponding to the multicast service, and the fourth identifier being used for the user equipment to determine whether the multicast service is activated. The transmission unit 1330 is further configured to transmit the response to the user equipment. In addition to the five units, the SMF entity 1300 may also include other components. Since these components are irrelevant to the content of the embodiments of the present disclosure, the corresponding illustration and description will be omitted here.

First, the assignment unit 1310 may establish a protocol data unit session, and assign an Internet Protocol address (IP address) to the user equipment. For example, in an example where the first identifier is S-NSSAI and the second identifier is DNN, the UE may transmit a PDU session establishment request to the network according to the S-NSSAI and the DNN corresponding to the multicast service, where the PDU session establishment request may include the S-NSSAI and the DNN corresponding to the multicast service. Then, the AMF entity may select one SMF entity from multiple SMF entities according to the S-NSSAI and the DNN corresponding to the multicast service. Then, the selected SMF entity may select one UPF entity from multiple UPF entities and assign an IP address to the UE.

Then, the acquisition unit 1320 acquires a multicast address of a multicast service to be activated by the user equipment from a user plane function entity participating in the establishment of the protocol data unit session, where the multicast address is acquired after the user equipment transmits a data packet to a network including the user plane function entity according to the Internet Protocol address, the data packet is used for indicating the multicast service that the user equipment intends to activate, and A destination address of the data packet is the multicast address of the multicast service, or a protocol part of the data packet includes the multicast address of the multicast service.

Specifically, the UE may transmit a data packet to a network according to the acquired IP address, so that a user plane function entity in the network acquires the data packet. A destination address of the data packet is the multicast address of the multicast service, or a protocol part of the data packet includes the multicast address of the multicast service. For example, the UE may transmit an IGMP Join data packet to the network based on the assigned IP address after completing the establishment of the PDU session. When IGMP version 1 or 2 is used, a destination IP address of the IGMP Join data packet may be the multicast address of the multicast service. When IGMP version 3 is used, an IGMP protocol part of the IGMP Join data packet may include the multicast address of the multicast service.

Correspondingly, the acquisition unit 1320 may acquire a multicast address of a multicast service to be activated by the user equipment from the user plane function entity. For example, after detecting an IGMP Join data packet according to a packet detection rule (PDR) configuration of the SMF entity, the above UPF entity may report a multicast address corresponding to the IGMP Join data packet to the SMF entity (e.g., report the multicast address corresponding to the IGMP Join packet through an N4 session report message).

The transmission unit 1330 may transmit a request for instructing the user equipment to activate the multicast service to the user equipment in a case that the SMF entity decides to instruct the user equipment to activate the multicast service, where the request for instructing the user equipment to activate the multicast service includes a first identifier and a second identifier corresponding to the multicast service to be activated by the user equipment, and the multicast address of the multicast service. For example, the transmission unit 1330 may transmit the request for instructing the user equipment to activate the multicast service to the user equipment through the access and mobility management function entity.

For example, the SMF entity may transmit a message to the AMF entity through an Namf interface, where the message may be transmitted through a message related to the N1 interface and communicated through the Namf interface, and may be represented as Namf_Communication_N1MessageTransfer. The message may include a message for requesting MBS UE Context Activation to instruct the UE to activate the multicast service. The message for requesting MBS UE Context activation may include the S-NSSAI and the DNN corresponding to the multicast service to be activated by the user equipment, and the multicast address of the multicast service, and the message for requesting MBS UE Context activation may be represented as Request MBS UE Context Activation. In addition, the "Request MBS UE Context Activation" described herein may be encapsulated using the specific format described above (e.g., N1 MBS SM Container).

Then, the AMF entity may transmit a downlink NAS transport message related to an N2 interface to the RAN through the N2 interface. The downlink NAS transport message related to the N2 interface may be represented as N2 downlink NAS Transport. The downlink NAS transport message related to the N2 interface may include a downlink NAS transport (DL NAS Transport) message, where the DL NAS Transport message may include the above "Request MBS UE Context Activation" encapsulated by the N1 MBS SM Container. Through the downlink NAS transport message related to the N2 interface, the AMF entity may instruct the RAN to directly transmit the DL NAS Transport message to the UE. Then, the RAN may transmit the DL NAS Transport message described above to the UE. Correspondingly, the UE may acquire a first identity, a second identity, and a multicast address from the SMF entity through the DL NAS Transport message.

Then, the receiving unit 1340 receives a request for activating a user equipment multicast service context from the user equipment, where the user equipment multicast service context is established by the user equipment for activating a multicast service, the request for activating the user equipment multicast service context includes a third identifier and a multicast address of the multicast service, and the third identifier is used for identifying the user equipment multicast service context. The determining unit 1350 determines a response to the request for activating the user equipment multicast service context, where the response includes a fourth identifier corresponding to the multicast service, and the fourth identifier is used for the user equipment to determine whether the multicast service is activated. The transmission unit 1330 transmits the response to the user equipment.

According to the session management function entity of the embodiments of the present disclosure, in the multicast service activation process, the session management function entity may receive, from a user equipment, a first identifier and a second identifier corresponding to a multicast service to be activated by the user equipment, a third identifier, and a multicast address of the multicast service, determine a fourth identifier corresponding to the multicast service at least according to such information, and feed back the fourth identifier to the user equipment, so that the user equipment activates the multicast service.

Figure 14:
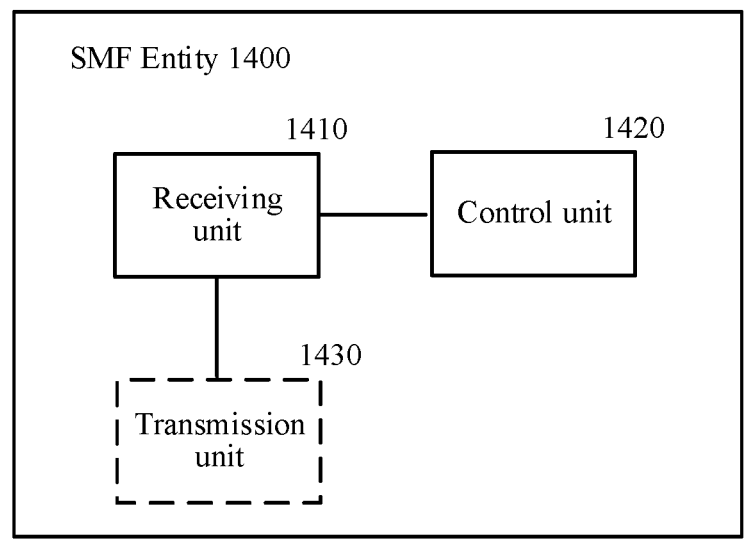
FIG. 14 is another schematic structural diagram of a session management function entity according to an embodiment of the present disclosure.

An SMF entity corresponding to the method shown in FIG. 7 according to the embodiments of the present disclosure will be described below with reference to FIG. 14. FIG. 14 is still another schematic structural diagram of an SMF entity 1400 according to an embodiment of the present disclosure. Because the functions of the SMF entity 1400 are the same as the details of the method described above with reference to FIG. 7, the detailed description of the same contents is omitted here for brevity. As shown in FIG. 14, the SMF entity 1400 includes: a receiving unit 1410, configured to receive a first request from a policy control function entity, the first request being used for requesting to start a multicast/broadcast service session, the first request including at least a fourth identifier corresponding to a multicast/broadcast service, a quality of service rule of at least one data flow corresponding to the multicast/broadcast service, and an identifier of the multicast/broadcast service session, and the fourth identifier being an identifier assigned by an application function entity to the multicast/broadcast service; and a control unit 1420, configured to perform the multicast/broadcast service session according to the first request. In addition to the two units, the SMF entity 1400 may also include other components. Since these components are irrelevant to the content of the embodiments of the present disclosure, the corresponding illustration and description will be omitted here. One or more units of the SMF Entity 1200, 1300, and 1400 can be implemented by processing circuitry, software, or a combination thereof, for example.

In the present disclosure, the receiving unit 1410 receives the first request from the policy control function entity corresponding to the SMF entity, the first request being used for requesting to start a multicast/broadcast service session (MBS Session), the first request including at least a fourth identifier corresponding to a multicast/broadcast service, a quality of service rule (QoS rule) of at least one data flow corresponding to the multicast/broadcast service, and an identifier of the multicast/broadcast service session, and the fourth identifier being an identifier assigned by an application function entity to the multicast/broadcast service.

According to an example of the present disclosure, the fourth identifier in the first request is the TMGI described above. The identifier of the multicast/broadcast service session in the first request may be an ID of the multicast/broadcast service session. In addition, the first request may further include other information, for example, an estimated duration of the multicast/broadcast service session (estimated Session Duration), and a data transmission time of the multicast/broadcast service (time to MBS data transfer).

In addition, according to an example of the present disclosure, the PCF entity corresponding to the SMF entity may transmit a first request to the SMF entity through an Nsmf interface to request to start a multicast/broadcast service session. The first request may be represented as Nsmf_MBS SessionStart Request.

In addition, according to an example of the present disclosure, the first request received by the receiving unit 1410 is determined by the policy control function entity according to a second request received from a network exposure function entity or an application function entity, and the second request is used for the network exposure function entity or the application function entity to request the policy control function entity to start a multicast/broadcast service session. The second request includes at least the fourth identifier, an identifier of the session management function entity, information of at least one data flow corresponding to the multicast/broadcast service, a quality of service requirement of the at least one data flow, the identifier of the multicast/broadcast service session, the estimated duration of the multicast/broadcast service session, and the data transmission time of the multicast/broadcast service.

In this example, the NEF entity may transmit the second request to the PCF entity through an Npcf interface to request to start the multicast/Broadcast business session. The second request may be represented as Npcf_MBS SessionStart Request.

In this example, the second request is determined by the network exposure function entity according to a third request received from an application function entity. The third request includes at least the fourth identifier, an identifier of at least one session management function entity, information of at least one data flow corresponding to the multicast/broadcast service, a quality of service requirement of the at least one data flow, the identifier of the multicast/broadcast service session, the estimated duration of the multicast/broadcast service session, and the data transmission time of the multicast/broadcast service.

In this example, the AF entity may transmit the third request to the NEF entity through an Nnef interface to request to start the multicast/broadcast service session. The third request may be represented as Nnef_MBS SessionStart Request.

In addition, any one of the first request, the second request, and the third request described above may further include an aggregate maximum rate corresponding to the multicast/broadcast service. The aggregate maximum rate may have a value in the downlink direction, but not in the uplink direction. The aggregate maximum rate may have both a value in the downlink direction and a value in the uplink direction. The aggregate maximum rate may be an Aggregate Maximum Bit Rate (AMBR).

In addition, the control unit 1420 performs the multicast/broadcast service session according to the first request. In this case, the SMF entity 1400 may further include a transmission unit 1430.

Specifically, the control unit 1420 may generate a quality of service flow identity (QoS Flow Identity, QFI) corresponding to each data flow, a quality of service flow profile (QoS Profile), and a quality of service flow enforcement rule (QoS Enforcement Rule, QER) according to the quality of service rule of each data flow in the at least one data flow corresponding to the multicast/broadcast service). In the present disclosure, the quality of service flow identity corresponding to each data flow may also be referred to as a quality of service flow identity of the multicast/broadcast service (MBS QFI). In addition, the quality of service enforcement rule described herein may be similar to a N4 QER rule.

Then, the control unit 1420 may select a user plane function entity from at least one user plane function entity according to the fourth identifier. In an example where the fourth identifier is a TMGI, for a multicast service, the SMF entity may determine a corresponding MBS UE Context according to the TMGI, and according to the determined MBS UE Context, acquire S-NSSAI, a DNN, and a multicast address contained in the MBS UE Context. For a broadcast service, the first request message includes a broadcast address of the broadcast service, S-NSSAI and a DNN used by the broadcast service, and a service area of the broadcast service. Then, the control unit 1420 may select one UPF entity from multiple UPF entities according to the acquired S-NSSAI, DNN, and multicast/broadcast address.

Then, the transmission unit 1430 may transmit a fourth request to the selected user plane function entity. The fourth request includes at least a multicast/broadcast address of the multicast/broadcast service, a quality of service enforcement rule of the at least one data flow corresponding to the multicast/broadcast service, and an aggregate maximum rate (e.g., AMBR) corresponding to the multicast/broadcast service. For example, the transmission unit 1430 may transmit a request for requesting to establish an MBS session to the selected UPF entity through the N4 interface, where the request may be represented as N4 MBS Session Establishment Request.

Then, the receiving unit (not shown in the figure) of the SMF entity may acquire a response to the fourth request from the selected user plane function entity, where the response to the fourth request includes a tunnel multicast address assigned by the selected user plane function entity for transmitting service data corresponding to the multicast/broadcast service and a fifth identifier corresponding to the tunnel multicast address, the tunnel multicast address is used for multicast tunnel transmission between network entities, and the fifth identifier is used for identifying a transmission tunnel of the multicast/broadcast service (e.g., a GTP-related transmission tunnel).

For example, the UPF entity may establish a GTP user plane tunnel transmission tree from the UPF entity to the RAN based on a multicast routing protocol according to the received request, so as to transmit data to be transmitted by the UPF entity to the RAN (e.g., service data corresponding to the multicast/broadcast service) in the form of a tree-like GTP user plane tunnel. Then, the UPF entity may assign a tunnel multicast address for transmitting the service data corresponding to the multicast/broadcast service. Specifically, the UPF entity may assign the multicast/broadcast service a multicast address passing through a GTP user plane tunnel of an N3 interface, and use the assigned multicast address of the GTP user plane tunnel as the tunnel multicast address. The "tunnel multicast address" described herein may also be referred to as a transport layer IP multicast address (Transport IP Multicast Address). Then, the UPF entity may assign a fifth identifier, for example, a Common-Tunnel End point ID (C-TEID), to the multicast/broadcast service.

After the UPF entity assigns the tunnel multicast address and the fifth identifier to the multicast/broadcast service, the UPF entity may transmit a response message to the SMF entity through an N4 interface, in response to the request transmitted by the SMF entity to the UPF entity for requesting to establish the MBS session. The response message may include the tunnel multicast address corresponding to the multicast/broadcast service and the fifth identifier corresponding to the multicast/broadcast service. The response message may be represented as N4 MBS Session Establishment Response.

Correspondingly, the control unit 1420 may acquire the tunnel multicast address corresponding to the multicast/broadcast service from the selected UPF entity, and acquire the fifth identifier corresponding to the multicast/broadcast service from the selected user plane function entity. Then, the control unit 1420 may record the tunnel multicast address and the fifth identifier in each user equipment multicast service context of the multicast service that is already activated.

In addition, the transmission unit 1430 may transmit a response message to the PCF entity in response to the first request transmitted by the PCF entity to the SMF entity. For example, the response message may be an acknowledgment of the "Nsmf_MBS SessionStart Request" transmitted by the PCF entity to the SMF entity, and the response message may be represented as Nsmf_MBS SessionStart Response.

Then, the PCF entity may transmit a response message to the NEF entity in response to the second request transmitted by the NEF entity to the PCF entity. For example, the response message may be an acknowledgment of the "Npcf_MBS SessionStart Request" transmitted by the NEF entity to the PCF entity, and the response message may be represented as Npcf_MBS SessionStart Response.

Then, the control unit 1420 may determine an identifier (e.g., RAN ID) of at least one serving base station according to each user equipment multicast service context of the multicast/broadcast service that is already activated. As described above, in the multicast/broadcast service activation process, the SMF entity may record an identifier of a serving base station of a UE that activates the multicast/broadcast service in an MBS UE Context of the UE.

Therefore, the control unit 1420 may acquire all RAN IDs from each user equipment multicast service context of the multicast/broadcast service that is already activated.

Then, the control unit 1420 may respectively determine an identifier of a corresponding access and mobility management function entity according to the identifier of each serving base station. For example, the control unit 1420 may acquire a corresponding AMF ID from the MBS UE Context corresponding to each RAN ID.

Then, the transmission unit 1430 may transmit a first message to each access and mobility management function entity according to the identifier of the each access and mobility management function entity, where the first message includes at least the identifier of the corresponding serving base station, the fourth identifier, an aggregate maximum rate (e.g., AMBR) corresponding to the multicast/broadcast service, a quality of service flow identity and a quality of service profile corresponding to each data flow, the fifth identifier, and the tunnel multicast address, so that each access and mobility management function entity transmits a fifth request to the corresponding serving base station, where The fifth request includes the first identifier, the fourth identifier, the quality of service flow identity and the quality of service profile corresponding to each data flow, the fifth identifier, and the tunnel multicast address.

For example, the transmission unit 1430 may transmit an MBS message transfer related to the N2 interface and communicated through an Namf interface to the AMF entity through an Namf interface, which may be represented as Namf_Communication_N2MBSMessageTransfer, and may include a RAN ID, a TMGI, the aggregate maximum rate (e.g., AMBR) corresponding to the multicast/broadcast service, the quality of service flow identity and the quality of service profile corresponding to each data flow of the multicast/broadcast service, and a CN N3 C-TEID and CN N3 tunnel multicast address. In addition, the TMGI, the quality of service flow identity and the quality of service profile corresponding to each data flow, and the CN N3 C-TEID and CN N3 tunnel multicast address may be encapsulated using a specific format. For example, the specific format may be an N2 interface-related session management container for the multicast/broadcast service (N2 MBS SM Container).

Then, each access and mobility management function entity may transmit a fifth request to the corresponding serving base station, where the fifth request includes the first identifier, the fourth identifier, the aggregate maximum rate (e.g., AMBR) corresponding to the multicast/broadcast service, the quality of service flow identity and the quality of service profile corresponding to each data flow of the multicast/broadcast service, the fifth identifier, and the tunnel multicast address. For example, the AMF entity may transmit a request for requesting to start an MBS session to the RAN through an N2 interface, where the request may be represented as N2 MBS Session Start Request, and may include the S-NSSAI and TMGI corresponding to the multicast/broadcast service, the aggregate maximum rate (e.g., AMBR) corresponding to the multicast/broadcast service, the quality of service flow identity and the quality of service profile corresponding to each data flow of the multicast/broadcast service, the CN N3 C-TEID corresponding to the multicast/broadcast service, and the CN N3 tunnel multicast address corresponding to the multicast/broadcast service.

Then, the serving base station may transmit a response message to the AMF entity in response to the fifth request. For example, the RAN may transmit the response message to the AMF entity through the N2 interface in response to the request transmitted by the AMF entity to the RAN for requesting to start an MBS session. The response message may be an acknowledgment of the N2 MBS Session Start Request transmitted by the AMF entity to the RAN, and may be represented as N2 MBS Session Start Response.

Then, the serving base station may allocate a resource for transmitting MBS service data to UEs served by the serving base station, to support data flows with different quality of service requirements. Accordingly, the UEs may receive the MBS service data through the allocated resources.

Then, the serving base station may join a transport group corresponding to the tunnel multicast address (e.g., CN N3 tunnel multicast address) described above, and receive the MBS service data from the UPF entity. That is to say, a transmission tree from the UPF entity to the serving base station may be established to transmit data (e.g., MBS service data) to be transmitted by the UPF entity to the serving base station in a tree-like manner.

Then, the AMF entity may transmit a notification message to the SMF entity to notify the message transmitted by the SMF entity to the AMF entity. For example, the AMF entity may transmit the notification information to the SMF entity through the Namf interface. The notification information may be an acknowledgment of the message transmitted by the SMF entity to the AMF entity. The notification information may be transmitted through an MBS message related to the N2 interface and communicated through the Namf interface, and may be represented as Namf_Communication_N2MBSMessageNotify.

Then, when the NEF entity receives the response messages of all the PCF entities, or after a preset time after the NEF entity receives the response messages of all the PCF entities, the NEF entity may transmit a response message to the AF entity in response to the third request transmitted by the AF entity to the NEF entity. For example, the NEF entity may transmit the response message to the AF entity through the Nnef interface, and the response message may be represented as Nnef_MBS SessionStart Response. In addition, the response message may include a first list and a second list. The first list may be a list of SMF IDs of SMF entities that have successfully established a user plane corresponding to the multicast/broadcast service. The second list may be a list of SMF IDs of SMF entities that have not successfully established a user plane corresponding to the multicast/broadcast service.

Then, when the AF entity receives the response message from the NEF entity, or after a preset time after the AF entity receives the response message from the NEF entity, the above process for establishing a user plane corresponding to the multicast/broadcast service may be executed again for the SMF entities corresponding to the SMF IDs in the second list.

So far, the user plane corresponding to the multicast/broadcast service has been successfully established. This means that the multicast/broadcast service may be started. For example, the AF entity may transmit multicast/broadcast service data (e.g., MBS data packets) whose destination IP address is the multicast/broadcast address of the multicast/broadcast service to each downstream UPF entity. Then, the UPF entities may transmit the multicast/broadcast service data to the RANs by the transport layer multicast method described above. Then, the RANs may transmit the multicast/broadcast service data to the UEs through the resources allocated to the UEs.

According to the session management function entity of the embodiments of the present disclosure, the session management function entity may receive a request for requesting to start a multicast/broadcast service session from a policy control function entity, where the request may include a fourth identifier corresponding to a multicast/broadcast service, a quality of service rule of at least one data flow corresponding to the multicast/broadcast service, and an identifier of the multicast/broadcast service session; and the session management function entity may perform the multicast/broadcast service session according to the request to transmit multicast/broadcast service data, thereby realizing the application of the PCC technology to the transmission of multicast/broadcast service data, and achieving the integration of PCC with the transmission of multicast/broadcast service data.

Figure 15:
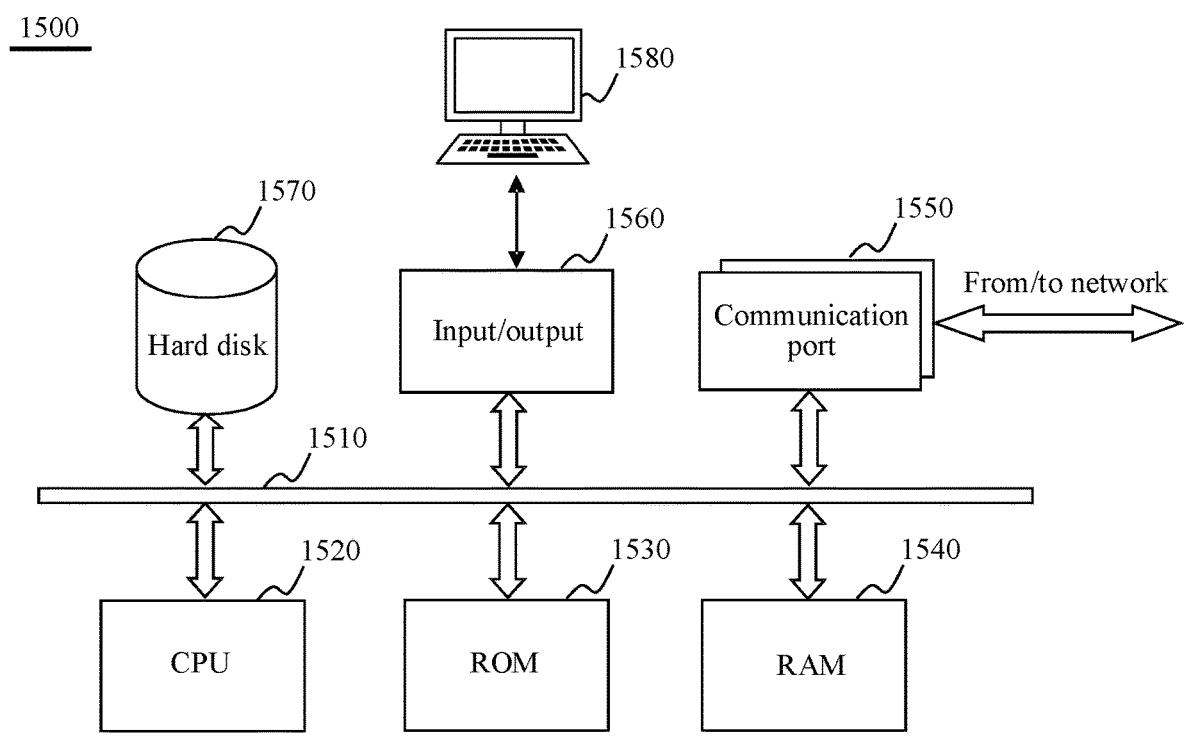
FIG. 15 shows an architecture of a device according to an embodiment of the present disclosure.

In addition, devices according to the embodiments of the present disclosure (e.g., UE, RAN, AMF entity, SMF entity, UPF entity, PCF entity, NEF entity, AF entity, etc.) may also be implemented using an architecture of a computing device shown in FIG. 15. FIG. 15 shows an architecture of a computing device. As shown in FIG. 15, the computing device 1500 may include a bus 1510, processing circuitry (e.g., one or more CPUs 1520), a read-only memory (ROM) 1530 (i.e., a non-transitory computer-readable storage medium), a random access memory (RAM) 1540, a communication port 1550 connected to a network, an input/output component 1560, a hard disk 1570, and the like. A storage device, for example, the ROM 1530 or the hard disk 1570, in the computing device 1500 may store various data or files used in computer processing and/or communication and program instructions executed by the CPU. The computing device 1500 may further include a user interface 1580. Certainly, the architecture shown in FIG. 15 is only exemplary, and when different devices are implemented, one or more components in the computing device shown in FIG. 15 may be omitted.

The embodiments of the present disclosure may alternatively be implemented as a computer-readable storage medium. Computer-readable instructions are stored on the computer-readable storage medium according to an embodiment of the present disclosure. The computer-readable instructions, when executed by a processor, may perform the method according to the embodiments of this disclosure described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, a flash memory, and the like.

According to an aspect of the present disclosure, a computer program product or a computer program is provided, the computer program product or the computer program including computer instructions, the computer instructions being stored in a computer-readable storage medium. A processor of the computing device reads the computer instructions from the computer-readable storage medium, and the processor executes the computer instructions to cause the computing device to perform the method according to the embodiments of the present disclosure described above with reference to the above figures.

A person skilled in the art can understand that content disclosed in the present disclosure may have various variations and improvements. For example, the devices or components described above may be implemented by using hardware, or may be implemented by using software, firmware, or a combination of some or all of the software, the firmware, and the hardware.

In addition, as shown in the embodiment of the present disclosure and the claims, words such as "a/an", "one", and/or "the" do not refer specifically to singular forms and may also include plural forms, unless the context expressly indicates an exception. The "first", the "second" and similar terms used in the present disclosure do not indicate any order, quantity or significance, but are used to only distinguish different components. Similarly, a similar term such as "include" or "comprise" means that an element or an item appearing in front of the term covers an element or an item and equivalents thereof listed behind the term, but does not exclude another element or item. A similar term such as "connect" or "connection" is not limited to a physical or mechanical connection, but may include an electrical connection, whether direct or indirect.

In addition, flowcharts are used in the present disclosure for illustrating operations performed by the system according to the embodiments of the present disclosure. It is to be understood that, the foregoing or following operations are not necessarily strictly performed according to an order. On the contrary, the operations may be performed in a reverse order or simultaneously. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art. The terms such as those defined in commonly used dictionaries are to be interpreted as having meanings that are consistent with the meanings in the context of the related art, and are not to be interpreted in an idealized or extremely formalized sense, unless expressively so defined herein.

The present disclosure is described in detail above, but the present disclosure is not limited to the embodiments described in this specification. The embodiments of the present disclosure may be implemented in different ways and/or modified without departing from the spirit and scope of the present disclosure.

What is claimed is:

1. A method comprising:
   determining, by processing circuitry of user equipment (UE), which activation manner of a first activation manner and a second activation manner is to be performed to activate a multicast service; and
   activating the multicast service according to the determined activation manner through a Session Management Function (SMF) entity, wherein
   the first activation manner activates the multicast service without establishing a Protocol Data Unit (PDU) session and without acquiring an Internet Protocol (IP) address assigned by the SMF entity, and
   the second activation manner includes establishing the PDU session and acquiring the IP address assigned by the SMF entity before activating the multicast service.

2. The method according to claim 1, wherein before the determining, the method further comprises:
   determining a first identifier and a second identifier corresponding to the multicast service, wherein the first identifier and the second identifier are used for an access and mobility management function entity to select the SMF entity.

3. The method according to claim 2, wherein the first identifier identifies a network slice corresponding to the multicast service, and the second identifier identifies a data network corresponding to the multicast service.

4. The method according to claim 2, wherein the determining the first identifier and the second identifier comprises:
acquiring a user equipment route selection policy rule corresponding to each multicast service of one or more multicast services from a policy control function entity, wherein each user equipment route selection policy rule comprises at least a multicast address of the corresponding multicast service;
determining the user equipment route selection policy rule corresponding to the multicast service according to the multicast address of the multicast service; and
determining the first identifier and the second identifier corresponding to the multicast service according to the determined user equipment route selection policy rule.

5. The method according to claim 2, wherein the activating comprises:
determining a third identifier, wherein the third identifier identifies a user equipment multicast service context established for activating the multicast service;
transmitting a request for activating the user equipment multicast service context to the SMF entity, wherein the request for activating the user equipment multicast service context includes the third identifier and a multicast address of the multicast service; and
receiving a response to the request for activating the user equipment multicast service context from the SMF entity, wherein the response includes a fourth identifier corresponding to the multicast service, and the fourth identifier indicates to the UE whether the multicast service is activated.

6. The method according to claim 5, wherein the transmitting the request comprises:
transmitting the request for activating the user equipment multicast service context to the SMF entity through the access and mobility management function entity.

7. The method according to claim 5, wherein the receiving the response comprises:
receiving the response to the request for activating the user equipment multicast service context from the SMF entity through a base station serving the UE and through the access and mobility management function entity.

8. The method according to claim 5, wherein before the determining the third identifier, the method further comprises:
acquiring an acquired first identifier, an acquired second identifier, and an acquired multicast address from the SMF entity; and
determining whether the acquired first identifier matches the determined first identifier, whether the acquired second identifier matches the determined second identifier, and whether the acquired multicast address matches the multicast address of the multicast service.

9. The method according to claim 8, wherein, before the acquiring the acquired first identifier, the acquired second identifier, and the acquired multicast address from the SMF entity, the method further comprises:
acquiring the Internet Protocol (IP) address from the SMF entity according to the first identifier and the second identifier; and
transmitting a data packet to a network according to the acquired IP address, so that a user plane function entity in the network receives the data packet, wherein the data packet indicates the multicast service that the UE intends to activate.

10. The method according to claim 9, wherein
the acquiring the IP address comprises:
selecting the SMF entity according to the first identifier and the second identifier, establishing the protocol data unit (PDU) session, and acquiring the IP address from the SMF entity; and
the transmitting the data packet to the network comprises:
transmitting the data packet to the network according to the acquired IP address, so that the user plane function entity participating in the establishment of the PDU session in the network receives the data packet, wherein (1) a destination address of the data packet is the multicast address of the multicast service, or (2) a protocol part of the data packet includes the multicast address of the multicast service.

11. A method comprising:
receiving, by processing circuitry of a session management function (SMF) entity, from a user equipment (UE), a request for activating a user equipment multicast service context, the user equipment multicast service context being established by the UE for activating a multicast service according to which activation manner of a first activation manner and a second activation manner is to be performed to activate the multicast service, the request for activating the user equipment multicast service context including a third identifier and a multicast address of the multicast service, and the third identifier identifying the user equipment multicast service context;
generating a response to the request for activating the user equipment multicast service context, the response comprising a fourth identifier corresponding to the multicast service, the fourth identifier indicating to the UE whether the multicast service is activated; and
transmitting the response to the UE, wherein
the first activation manner activates the multicast service without establishing a Protocol Data Unit (PDU) session and without acquiring an Internet Protocol (IP) address assigned by the SMF entity, and
the second activation manner includes establishing the PDU session and acquiring the IP address assigned by the SMF entity before activating the multicast service.

12. The method according to claim 11, wherein the receiving the request comprises:
receiving the request for activating the user equipment multicast service context from the UE via an access and mobility management function entity.

13. The method according to claim 11, wherein the transmitting the response comprises:
transmitting the response to the UE through a base station serving the UE and through an access and mobility management function entity.

14. The method of claim 11, wherein, before the receiving the request, the method further comprises:
establishing the protocol data unit (PDU) session;
assigning the Internet Protocol (IP) address to the UE;
acquiring the multicast address of the multicast service to be activated by the UE from a user plane function entity participating in the establishment of the PDU session, wherein the multicast address is acquired after the UE transmits a data packet to a network including the user plane function entity according to the IP address, and the data packet indicates the multicast service that the UE intends to activate; and
transmitting, to the UE, a request instructing the UE to activate the multicast service in response to a determination in the SMF entity to instruct the UE to activate the multicast service, wherein the request instructing the UE to activate the multicast service includes a first identifier and a second identifier corresponding to the multicast service to be activated by the UE, and includes the multicast address of the multicast service.

15. The method according to claim 12, wherein the method further comprises:
receiving a unique identifier of the UE and an identifier of a base station serving the UE from the access and mobility management function entity.

16. The method according to claim 15, wherein the method further comprises:
recording the identifier of the base station serving the UE in the user equipment multicast service context, so as to acquire identifiers of base stations serving all UEs that activate the multicast service through the SMF entity.

17. The method according to claim 14, wherein the generating the response comprises:
determining whether the UE is configured to use the multicast service;
transmitting a notification to an application function entity in response to a determination that the UE is configured to use the multicast service, wherein the notification is an authorization request notification for the multicast service; and
receiving a response to the notification from the application function entity, wherein the response to the notification includes the fourth identifier corresponding to the multicast service.

18. The method according to claim 17, wherein the notification includes at least the first identifier, the second identifier, the multicast address of the multicast service, and an identifier of the SMF entity, the identifier of the SMF entity such that the application function entity acquires identifiers of SMF entities involved in activation of the multicast service by all UEs that intend to activate the multicast service.

19. The method according to claim 17, wherein the transmitting the notification comprises:
transmitting the notification to the application function entity through a network exposure function entity.

20. A user equipment (UE) apparatus, comprising:
processing circuitry configured to
determine which activation manner of a first activation manner and a second activation manner is to be performed to activate a multicast service; and
activate the multicast service according to the determined activation manner through a Session Management Function (SMF) entity, wherein
the first activation manner activates the multicast service without establishing a Protocol Data Unit (PDU) session and without acquiring an Internet Protocol (IP) address assigned by the SMF entity, and
the second activation manner includes establishing the PDU session and acquiring the IP address assigned by the SMF entity before activating the multicast service.

\* \* \* \* \*

UNITED STATES PATENT AND TRADEMARK OFFICE
CERTIFICATE OF CORRECTION

| | | |
|---|---|---|
| PATENT NO. | : 12,150,016 B2 | Page 1 of 1 |
| APPLICATION NO. | : 17/705163 | |
| DATED | : November 19, 2024 | |
| INVENTOR(S) | : Chunshan Xiong | |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Seventh Day of January, 2025

Derrick Brent
*Acting Director of the United States Patent and Trademark Office*